US011375581B2

(12) United States Patent
Edge

(10) Patent No.: US 11,375,581 B2
(45) Date of Patent: *Jun. 28, 2022

(54) ACCESS POINT GROUP DATA FOR POSITIONING

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 77 days.

This patent is subject to a terminal disclaimer.

(21) Appl. No.: 16/905,515

(22) Filed: Jun. 18, 2020

(65) Prior Publication Data

US 2020/0323035 A1 Oct. 8, 2020

Related U.S. Application Data

(60) Continuation of application No. 16/009,193, filed on Jun. 14, 2018, now Pat. No. 10,694,581, which is a
(Continued)

(51) Int. Cl.
*H04W 24/00* (2009.01)
*H04W 88/08* (2009.01)
(Continued)

(52) U.S. Cl.
CPC .......... *H04W 88/08* (2013.01); *G01S 5/0236* (2013.01); *G01S 5/0252* (2013.01); *H04W 4/024* (2018.02);
(Continued)

(58) Field of Classification Search
CPC ..... H04W 88/08; H04W 4/024; H04W 4/029; H04W 24/10; H04W 64/003;
(Continued)

(56) References Cited

U.S. PATENT DOCUMENTS 5,461,385 A * 10/1995 Armstrong ............. G08C 17/02
340/447
5,491,769 A 2/1996 Moller
(Continued)

FOREIGN PATENT DOCUMENTS

CN 101751440 A 6/2010
CN 103200678 A 7/2013
(Continued)

OTHER PUBLICATIONS

International Search Report and Written Opinion—PCT/US2014/054115—ISA/EPO—Nov. 6, 2014.
(Continued)

*Primary Examiner* — Stephen M D Agosta
(74) *Attorney, Agent, or Firm* — Weaver Austin Villeneuve & Sampson LLP

(57) ABSTRACT

Techniques are described for providing assistance data corresponding to a plurality of access points (APs). The techniques include, in part, providing assistance data to a mobile device. The assistance data comprises group data that is common among the plurality of APs. The group data is associated with a group identifier (ID). The techniques further include providing the group ID and a set of AP-specific information for at least one of the plurality of APs. The group data may include information corresponding to a common grid, common location area and/or common characteristics of the APs.

16 Claims, 10 Drawing Sheets

Related U.S. Application Data division of application No. 14/476,546, filed on Sep. 3, 2014, now Pat. No. 10,021,737.

(60) Provisional application No. 61/879,092, filed on Sep. 17, 2013.

(51) Int. Cl.

| | | |
|---|---|---|
| *H04W 24/10* | (2009.01) | |
| *H04W 4/024* | (2018.01) | |
| *H04W 4/029* | (2018.01) | |
| *G01S 5/02* | (2010.01) | |
| *H04W 64/00* | (2009.01) | |

(52) U.S. Cl.
CPC .......... *H04W 4/029* (2018.02); *H04W 24/10* (2013.01); *H04W 64/003* (2013.01)

(58) Field of Classification Search
CPC ....... H04W 64/00; H04W 4/02; G01S 5/0236; G01S 5/0252; G01S 19/05; G01S 19/258; H04L 67/18; H04L 67/10; H04L 12/66; H04L 61/2007; H04L 61/25; H04L 61/255; H04B 10/29; H04B 3/04; H04B 3/14; H04B 7/15; H04B 7/18554; H04J 14/02; H04M 2207/203; H04M 2242/04; H04M 2242/30; H04M 3/5116; H04M 1/72457; H04M 2250/10; H04M 2250/52
See application file for complete search history.

(56) References Cited

U.S. PATENT DOCUMENTS

| | | | |
|---|---|---|---|
| 6,058,338 A | 5/2000 | Agashe et al. | |
| 6,236,365 B1* | 5/2001 | LeBlanc | G01S 1/026 342/450 |
| 6,237,479 B1* | 5/2001 | Douba | B30B 1/186 100/48 |
| 6,406,246 B1* | 6/2002 | Itoh | G01R 31/01 324/757.04 |
| 6,453,237 B1 | 9/2002 | Fuchs et al. | |
| 6,671,620 B1 | 12/2003 | Garin et al. | |
| 6,671,745 B1* | 12/2003 | Mathur | G06F 9/54 719/321 |
| 7,400,974 B2 | 7/2008 | Fuchs et al. | |
| 7,495,608 B1 | 2/2009 | Chen et al. | |
| 7,593,365 B1 | 9/2009 | Delker et al. | |
| 8,032,151 B2 | 10/2011 | Paulson et al. | |
| 8,190,730 B2 | 5/2012 | Dempsey | |
| 8,289,958 B1* | 10/2012 | Narayanan | H04L 65/1006 370/389 |
| 8,644,853 B2 | 2/2014 | Moeglein et al. | |
| 8,674,877 B1* | 3/2014 | Mateski | G01S 19/06 342/357.42 |
| 8,680,987 B1* | 3/2014 | Okmyanskiy | G01S 19/05 340/426.19 |
| 8,708,624 B1* | 4/2014 | Marusiak | B27G 21/00 144/136.95 |
| 8,743,782 B1 | 6/2014 | Patel | |
| 8,768,382 B1* | 7/2014 | Gordin | H04W 64/00 455/456.2 |
| 8,775,065 B2 | 7/2014 | Gupta et al. | |
| 8,874,137 B2* | 10/2014 | Kang | H04W 64/00 455/456.1 |
| 8,917,206 B2 | 12/2014 | Edge et al. | |
| 8,977,207 B2 | 3/2015 | Ledlie | |
| 9,026,145 B1 | 5/2015 | Duleba et al. | |
| 9,261,370 B2* | 2/2016 | Poornachandran | ... H04W 4/024 |
| 9,303,322 B2* | 4/2016 | Victor | C25D 5/605 |
| 9,400,320 B2 | 7/2016 | Do et al. | |
| 9,794,984 B2 | 10/2017 | Edge et al. | |
| 9,813,866 B2 | 11/2017 | Do et al. | |
| 10,021,737 B2 | 7/2018 | Edge et al. | |
| 10,694,581 B2 | 6/2020 | Edge | |
| 2002/0168985 A1 | 11/2002 | Zhao et al. | |
| 2003/0050078 A1 | 3/2003 | Motegi et al. | |
| 2004/0049668 A1* | 3/2004 | Miyamoto | G06F 9/4416 713/1 |
| 2004/0049670 A1* | 3/2004 | Miyamoto | G06F 9/4416 713/2 |
| 2004/0049671 A1* | 3/2004 | Miyamoto | G06F 9/4416 713/2 |
| 2004/0248586 A1 | 12/2004 | Patel et al. | |
| 2004/0260622 A1 | 12/2004 | Chan et al. | |
| 2005/0077995 A1 | 4/2005 | Paulsen et al. | |
| 2005/0195781 A1 | 9/2005 | Ikeda | |
| 2006/0095348 A1 | 5/2006 | Jones et al. | |
| 2006/0149742 A1 | 7/2006 | Egnor | |
| 2006/0200843 A1 | 9/2006 | Morgan et al. | |
| 2006/0265507 A1 | 11/2006 | Banga et al. | |
| 2007/0258407 A1 | 11/2007 | Li et al. | |
| 2007/0275734 A1 | 11/2007 | Gaal et al. | |
| 2007/0281707 A1 | 12/2007 | Thomson et al. | |
| 2008/0284646 A1 | 11/2008 | Walley et al. | |
| 2009/0221316 A1* | 9/2009 | Chuang | G01S 5/0252 455/522 |
| 2010/0095293 A1 | 4/2010 | O'Neill et al. | |
| 2010/0157848 A1 | 6/2010 | Das et al. | |
| 2010/0273418 A1* | 10/2010 | Eruchimovitch | G01S 5/0221 455/41.2 |
| 2011/0032561 A1* | 2/2011 | Cachia | B41J 2/17546 358/1.15 |
| 2011/0057037 A1* | 3/2011 | Frysz | G16H 10/60 235/375 |
| 2011/0057836 A1 | 3/2011 | Ische et al. | |
| 2011/0059756 A1 | 3/2011 | Moeglein et al. | |
| 2011/0090123 A1 | 4/2011 | Sridhara et al. | |
| 2011/0111745 A1* | 5/2011 | Li | H04W 8/005 455/422.1 |
| 2011/0131255 A1 | 6/2011 | Kawamura | |
| 2011/0269479 A1 | 11/2011 | Ledlie | |
| 2011/0291885 A1 | 12/2011 | Marshall et al. | |
| 2011/0306341 A1* | 12/2011 | Klein | H04L 27/2684 455/434 |
| 2011/0317579 A1* | 12/2011 | Jones | G01S 5/0284 370/252 |
| 2012/0108290 A1 | 5/2012 | Shinozawa et al. | |
| 2012/0231808 A1 | 9/2012 | Moeglein | |
| 2013/0035109 A1 | 2/2013 | Tsuruya et al. | |
| 2013/0053067 A1 | 2/2013 | Aggarwal et al. | |
| 2013/0281111 A1* | 10/2013 | Syrjarinne | G01S 5/0252 455/456.1 |
| 2014/0011518 A1* | 1/2014 | Valaee | H04W 4/33 455/456.1 |
| 2014/0019246 A1 | 1/2014 | Fraccaroli | |
| 2015/0080020 A1* | 3/2015 | Edge | H04W 4/02 455/456.1 |
| 2018/0014354 A1 | 1/2018 | Edge | |
| 2018/0295673 A1 | 10/2018 | Edge | |
| 2019/0130741 A1* | 5/2019 | Eastling | H04W 4/44 |
| 2021/0067299 A1* | 3/2021 | Wu | H04L 5/0053 |
| 2021/0084441 A1* | 3/2021 | Zhou | H04W 4/023 |

FOREIGN PATENT DOCUMENTS

| | | |
|---|---|---|
| JP | 2009513060 A | 3/2009 |
| JP | 2010512043 A | 4/2010 |
| WO | 2006029277 A1 | 3/2006 |
| WO | 2009142943 A2 | 11/2009 |
| WO | 2010075341 A1 | 7/2010 |
| WO | 2010144607 A1 | 12/2010 |
| WO | 2011032027 A1 | 3/2011 |
| WO | 2011047310 A1 | 4/2011 |
| WO | 2011067466 A1 | 6/2011 |
| WO | 2011127005 A1 | 10/2011 |
| WO | 2011149781 A2 | 12/2011 |
| WO | 2012032376 A1 | 3/2012 |
| WO | 2012099997 A1 | 7/2012 |
| WO | 2013019452 A1 | 2/2013 |
| WO | 2013136129 A1 | 9/2013 |

(56) References Cited

FOREIGN PATENT DOCUMENTS

| WO | 2013149382 A1 | 10/2013 |
| WO | 2014070398 A1 | 5/2014 |
| WO | 2014127246 A1 | 8/2014 |

OTHER PUBLICATIONS

Stevens, W. Richard, TCP/IP Illustrated vol. I, 1994, Addison Wesley, vol. I, pp. 12, 34,233, 332-333, 469.

* cited by examiner

ACCESS POINT GROUP DATA FOR POSITIONING

CROSS-REFERENCE TO RELATED APPLICATIONS

This application is a continuation application of U.S. patent application Ser. No. 16/009,193, entitled "Techniques for Compressing and Aligning RF Heat Maps for Access Points," filed Jun. 14, 2018, now U.S. Pat. No. 10,694,581, issued Jun. 23, 2020, which claims the benefit of divisional application of U.S. patent application Ser. No. 14/476,546, entitled "Techniques for Determining Common Characteristics of Groups of Wireless Access Points," filed Sep. 3, 2014, now U.S. Pat. No. 10,021,737, issued Jul. 10, 2018, which claims the benefit of U.S. Provisional Application No. 61/879,092 entitled "Methods of Compressing and Aligning WiFi RF Heat Maps," filed Sep. 17, 2013, which are assigned to the assignee of the present application and are all hereby expressly incorporated by reference in their entireties.

TECHNICAL FIELD

The present disclosure relates generally to determining a location of a mobile device, and in particular, to storing and transferring radio frequency (RF) heat maps and other information corresponding to an access point or base station.

BACKGROUND

Generally, a location of a mobile device (e.g., location fix) may be determined using measurements made by the device of radio signals transmitted by a number of access points, base stations and/or navigation satellites situated at known locations. Obtaining a location fix for a mobile device has become a critically important function in recent years. For mobile devices, there are numerous applications and web based services that take advantage of the location fix of the mobile device. For example, a map application on a mobile device or on a remote web server can select appropriate maps, direction, driving routes, etc., based on the current location of the mobile device. A social networking application can identify other users within the vicinity based on the location of the mobile device. In an emergency situation, public safety can be dispatched to the precise location of the user of a mobile device even when the user is not aware of the precise location or not able to communicate it. Many other examples exist.

Different techniques for obtaining a position fix, also known as a location estimate, a location or a location fix, for a mobile device may be appropriate under different conditions. In an outdoor environment, satellite-based approaches, e.g., GNSS (Global Navigation Satellite System) techniques may be suitable, because the mobile device may be able to receive satellite-based positioning signals with specific timing characteristics. Based on reception of such satellites signals for typically four or more satellites, a position fix for the mobile device may be calculated. However, satellite-based approaches are not preferred in indoor environments, because satellite signals cannot always be received or accurately measured indoors.

In indoor environments, such as a shopping mall, airport, sports arena, convention center, museum, hospital, office building, etc., terrestrial-based approaches making use of signals transmitted from cellular base stations (BSs) and/or wireless local area network (WLAN) access points (APs) are generally more useful for obtaining an accurate location fix for a mobile device. The mobile device observes and measures signals sent from BSs and/or APs. Different types of measurements may be obtained by a mobile device such as RSSI (Received Signal Strength Indication) and RTT (Round-trip Time). Such measurements may allow the mobile device or a separate location server to estimate the distance of the mobile device to each BS and/or AP. The mobile device or a location server may then estimate the location of the mobile device, based on the distances to different BSs and/or APs and the known locations of the BSs and/or APs.

In another example, the mobile device may compare the measured signal strength from each BS or AP to a grid of signal strength data providing the expected (e.g., calculated or previously measured) signal strength from each BS or AP at different locations. The mobile device may then determine its location, using a process such as pattern matching, by finding a particular location for which the expected signal strengths for a number of BSs and/or APs most closely match the signal strengths measured by the mobile device. An advantage of this approach is that the locations of the BSs and/or APs may not need to be known—just the locations where signals from the BSs and/or APs can be received with different expected signal strengths.

One problem with BS and/or AP-based approaches, in which pattern matching is used and in which the mobile device computes its own location, is the amount of data that the mobile device may need to receive (e.g., from an external location server) about each AP or BS when expected BS or AP signal strength values are provided for a large number of different locations. For example, a WLAN AP based on IEEE 802.11 WiFi standards or a small BS (e.g., a Femto cell or Home Base Station) may typically provide coverage up to a distance of 100 meters from the AP or BS, and a location service provider may wish to enable location accuracy with an error about one meter. In such a case, expected signal strength values may be provided in the form of a "heat map" for a grid of location points spaced 1 meter apart from each other over the entire AP or BS coverage area. In this example, the number of separate location grid points may be around 40,000 (e.g., for a square grid of size 200 by 200 meters centered on the AP or BS). If the expected signal strength value for, and the location of, each grid point can be encoded using N octets of data, sending a heat map comprising the signal strength data to a mobile device for the entire AP or BS coverage area would consume 40,000×octets. Since a mobile device may be in coverage from other APs and/or small BSs, an equivalent amount of data may also need to be sent to the mobile device for each one of the other APs and/or small BSs. The total amount of data may easily be counted in mega-octets (e.g., even if N is as small as one octet) which may consume excessive resources in the mobile device, network and location server for signaling, processing and storage. In particular, this creates a problem for the mobile device, which generally has limited processing, battery power, and memory resources.

A second problem with BS and/or AP-based location approaches is that other data associated with BSs and APs may need to be provided to a mobile device (e.g., by a location server) in addition to or instead of a heat map for each BS and/or AP. Such other data may comprise information concerning the coverage area of each AP or BS (e.g., the geographic boundary of the coverage area), the type of coverage area (e.g., whether indoors, outdoors or partly indoors and partly outdoors) and other characteristics of each AP or BS such as the manufacturer of the BS or AP or the type of BS or AP (e.g., whether conforming to IEEE 802.11 WiFi standards or Bluetooth®). Such other data may also consume significant signaling, processing and storage if not transferred to a mobile device in an efficient compact form. Moreover, such additional data may require configuration in a network server (e.g., a location server) which may lead to an excessive amount of operator time to perform the configuration which in turn may cause various configuration errors when the data is configured for each of a large number of APs and/or BSs.

SUMMARY

As used herein, the term "access point" (AP) includes any wireless communication station and/or device, typically installed at a fixed terrestrial location and used to facilitate communication in a wireless communications system. For example, an access point may comprise a wireless local area network (WLAN) access point supporting the IEEE 802.11 standards or Bluetooth, a cellular base station, Macro cell base station, Macro base station, Pico cell base station, Pico base station, Femto cell, Femto base station, eNode B, Node B, home NodeB, Home eNode B, small cell base station or the like.

In one example, a method for providing assistance data corresponding to a first plurality of APs is disclosed. The method includes, in part, providing first assistance data to a mobile device, and providing the first group ID and a set of AP-specific information for at least one of the first plurality of APs. The first assistance data comprises a first group data that is common among the first plurality of APs, the first group data being associated with a first group identifier (ID). In one example, the first group data includes information corresponding to a common location area for the first plurality of APs.

The first group data may also include one or more of an indication of whether an altitude change is allowed within the common location area, a version, a validity period, and one or more common properties of APs including an identification of at least one of an AP manufacturer, an AP model, a chip manufacturer, a chip model and a signaling type.

In another example, the first group data includes information corresponding to a reference grid. The reference grid may be used in determining the set of AP-specific information. In one example, the reference grid includes at least one of a common grid point spacing, common grid origin, and a common grid orientation.

In one example, the method further includes determining the first group data by analyzing one or more characteristics of the first plurality of APs. In another example, the method further includes providing second assistance data to the mobile device corresponding to a second plurality of APs, and providing the second group ID. The second assistance data comprises group data that is common among the second plurality of APs. The group data is associated with a second group ID, and the second plurality of APs include at least one of the APs in the first plurality of APs. In one example, at least one of the APs in the first plurality of APs is different from at least one of the APs in the second plurality of APs. In another example, the first assistance data is different from the second assistance data.

In one example, a method for obtaining assistance data corresponding to a plurality of access points is disclosed. The method includes, in part, receiving assistance data from a device, receiving the group ID and a set of AP-specific information for at least one AP among the plurality of APs, and determining AP vicinity information corresponding to the at least one AP based on the group ID and the set of AP-specific information. The assistance data includes group data that is common among the plurality of APs. The group data is associated with a group ID.

In one example, the group data includes information corresponding to a common location area for the plurality of APs. In another example, the group data includes an indication of whether an altitude change is allowed within the common location area. In yet another example, the group data includes information corresponding to a reference grid that is used in determining AP-specific information corresponding to each of the plurality of APs.

In one example, an apparatus for providing assistance data corresponding to a first plurality of APs is disclosed. The apparatus includes, in part, means for providing first assistance data to a mobile device, and means for providing the first group ID and a set of AP-specific information for at least one of the first plurality of APs. The first assistance data includes a first group data that is common among the first plurality of APs. The first group data is associated with a first group ID.

In one example, a non-transitory computer readable medium for providing assistance data corresponding to a first plurality of APs is disclosed. The computer readable medium includes computer-readable instructions configured to cause a processor to provide first assistance data to a mobile device, and provide the first group ID and a set of AP-specific information for at least one of the first plurality of APs. The first assistance data includes a first group data that is common among the first plurality of APs, the first group data being associated with a first group ID.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
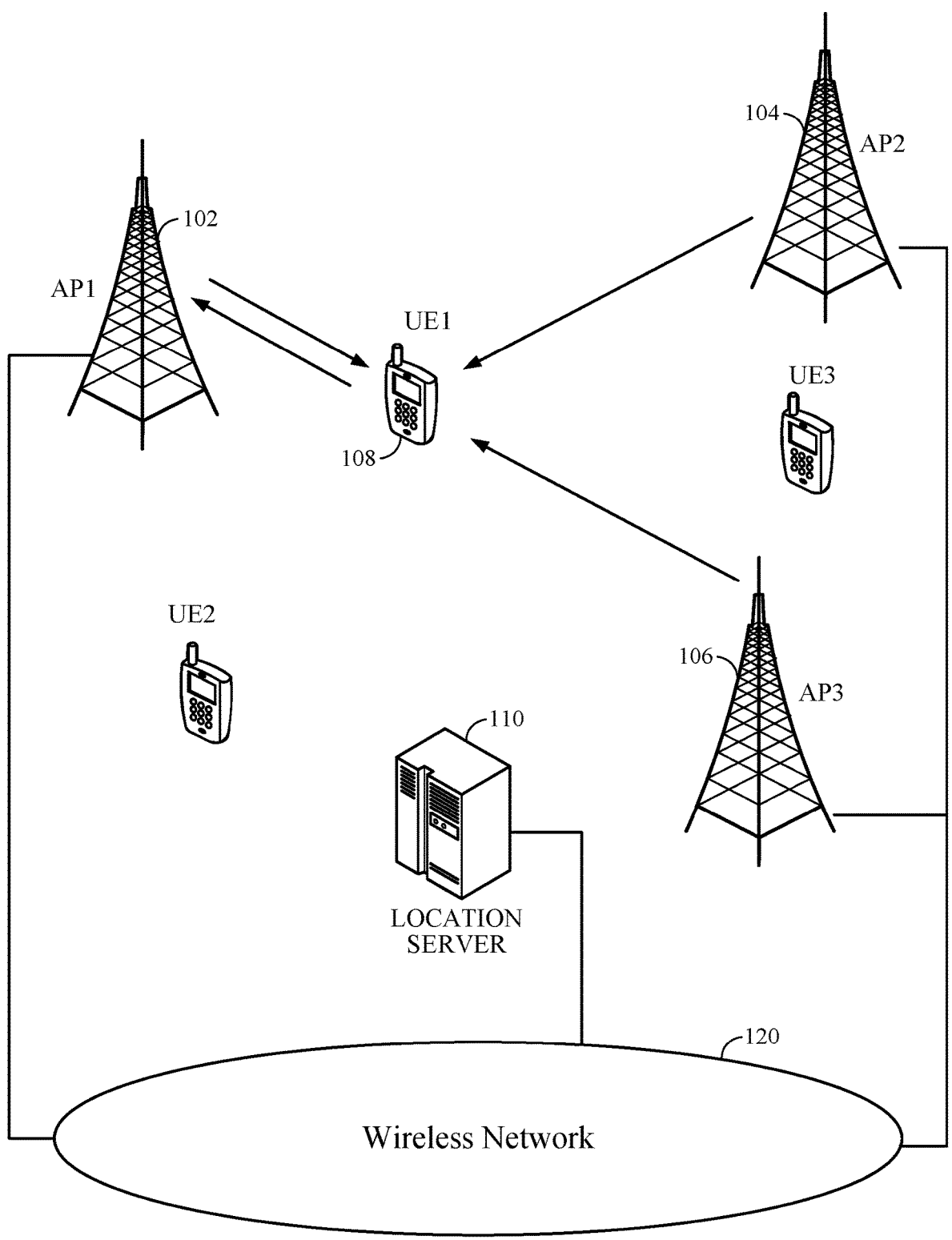
FIG. 1 illustrates a wireless communication network, in accordance with certain embodiments of the present disclosure.

This invention provides a method for efficiently providing vicinity related information (e.g., RF signal strength values, location area data for an AP coverage area, AP coverage area type) and other characteristics (e.g., type and manufacturer of an AP) for one or more of a plurality of access points (APs). The vicinity information may generally relate to any information that is indicative of a position for each of a plurality of locations (e.g., grid points) relative to a particular AP. For example, the vicinity information may include signal strength information (e.g., RSSI) at each location or grid point, timing values (e.g., RTT) at each location or grid point, or any other data that can be calculated and/or measured for a location or grid point. The vicinity information may be in the form of mean values, standard deviation values or other statistics.

As used herein, the terms "user equipment" (UE) or "mobile device" may be used interchangeably to refer to a device that may from time to time have a position location that changes. For example, a mobile device may comprise a cellular telephone, smartphone, tablet, wireless communication device, mobile station, laptop computer, a personal communication system (PCS) device, Secure User Plane Solution (SUPL) Enabled Terminal (SET), personal digital assistant (PDA), personal audio device (PAD), portable navigational device, and/or other portable communication devices.

In one embodiment, the vicinity information for one or more APs may be used in obtaining a location fix for a mobile device in an indoor environment. In this embodiment, the location fix may be a position derived from measurements made by the mobile device of signals transmitted by APs at known or unknown locations.

Generally, vicinity information for an AP (also referred to as an RF heat map, or a heat map) is a graphical representation of data where the individual RF signal characteristics (e.g., mean RSSI, mean RTT) are contained in a matrix corresponding to a set of grid points. The vicinity information for an AP may be depicted with a set of colors (e.g., where the magnitude of a signal characteristic at any grid point determines a specific color around that grid point), or a set of numbers.

Vicinity information for an AP may also comprise a description or definition of a location area that contains all or part of the coverage area of the AP. A location area may be defined geographically in terms of a circle (e.g., with given center and radius), an ellipse (e.g., with given center, major and minor axis and orientation), a polygon or some other geometric shape. Alternatively, a location area may be defined in civic terms—e.g., by providing an address or name for a building or building complex together with an identification for a particular part of the building or building complex (e.g., such as "Terminal 4" for an airport or "Main Building, floor 5, west side" for a hospital or museum).

Other information that may be provided for an AP may comprise information about the AP manufacturer, AP model, AP capabilities (e.g., whether supporting IEEE 802.11 signaling, Bluetooth signaling and/or signaling associated with a particular type of cellular network).

FIG. 1 illustrates a wireless communication system 100, in accordance with certain embodiments of the present disclosure. As illustrated, the system 100 may include a plurality of access points (e.g., AP1 102, AP2 104, AP3 106) and user equipments (e.g., UE1 108, UE2, UE3). In addition, the system 100 may include a location server (LS) 110. In some embodiments, the APs 102, 104 and 106 and the LS 110 may be connected to or may be part of a wireless network 120 which may provide communications services to UEs (e.g., UE1, UE2 and UE3) such as transfer of voice and/or data between each UE and some other device. Wireless network 120 and its APs (e.g., APs 102, 104 and 106) may support wireless communication (e.g., to and from UE1, UE2 and UE3) using any standard or proprietary wireless technology such as Global System for Mobile Communications (GSM) defined by the Third Generation Partnership Project (3GPP), Wideband Code Division Multiple Access (WCDMA) defined by 3GPP, Long Term Evolution (LTE) defined by 3GPP, cdma2000 defined by the Third Generation Partnership Project 2 (3GPP2), IEEE 802.11 WiFi, Bluetooth, etc. UE1 may communicate with its serving access point (e.g., AP1 102) through a forward link 112 and a reverse link 114. UE1 may also receive signals from other access points (e.g., AP2 104 and/or AP3 106). It should be noted that although only a few UEs and APs, and only one LS are illustrated in FIG. 1, any number of each of these devices may be present in the system 100.

Location server 110 may store signal strength information, timing information and/or other signal related information corresponding to different APs (e.g., Wi-Fi heat maps) on a grid of points. The information stored by LS 110 may be calculated by LS 110 (or by some other entity and then provided to LS 110) based on known characteristics of APs (e.g., AP locations, transmission power, antenna characteristics, radio technology) and information about the coverage area of APs (e.g., local terrain, building floor plans, building materials). The information stored in LS 110 may also or alternatively be compiled from signal measurements of APs made by mobile devices (and/or by other APs) specifically assigned to measure signal characteristics of APs and to send the measurements to a server (e.g., location server 110) via crowdsourcing as a background task. The information stored in LS 110 may correspond to calculated and/or measured signal characteristics for each AP (e.g., mean RSSI, mean RTT) at each of a number of grid points distributed over the coverage are of the AP. For example, the grid points may correspond to a rectangular array oriented in a certain direction and containing rows and columns of grid points in which the distance between adjacent grid points along each row or column may be fixed and small (e.g., one meter). LS 110 may provide some or all of the stored information to the UEs (e.g., UE1, UE2 and UE3) and/or to other devices.

In order to precisely identify a set of grid points, first, a bounding box may be considered that covers a region of interest. Multiple grid points may be defined within the bounding box. Typically, the grid points are uniformly distributed within the region of interest. As an example, the grid points may reside at the corners of, or at the centers of, square-shaped cells. In general, the cells may have any other shape, such as a square, rectangle, hexagon, circle, ellipse, etc. without departing from teachings of the present disclosure.

Signals corresponding to an access point may be measured or computed (e.g., based on a local building layout and known RF propagation laws) for each of the grid points to generate a heat map. The heat map may be stored in a location server or any other devices in a wireless communication system. The heat maps may then be provided (e.g., by location server 110) to one or more mobile devices (e.g., UE1, UE2 and UE3) in the vicinity of the access point. As an example, the heat maps may be provided to a mobile device by a location server using the SUPL location solution defined by the Open Mobile Alliance (OMA). The heat maps may also be provided using the Long Term Evolution (LTE) Positioning Protocol (LPP) Extensions protocol defined by OMA which is known as LPPe. In addition, a mobile device (e.g., UE1, UE2 or UE3) may request a heat map from a location server (e.g., location server 110) using SUPL or LPPe and may provide its capabilities to the location server to support receipt of a heat map using SUPL or LPPe.

As an example, a Wi-Fi heat map may be generated for an access point. Considering that the Wi-Fi signal may have a range of close to 100 meters, if grid points are located at 1 meter apart, 40,000 grid points may be considered for each AP, as described in an earlier example. Even if a signal characteristic (e.g., mean RSSI or mean RTT) corresponding to each grid point takes only one octet, the amount of information that needs to be stored/communicated with each mobile device per signal characteristic and per AP may be equal to 40,000 octets. In addition, the mobile device may receive information corresponding to multiple APs in its vicinity and for several signal characteristics, which can easily amount to megabytes of information.

Other information that be stored in location server 110 for each AP may include a location area comprising a coverage area of the AP (e.g., expressed in geographic form and/or in civic form), the type of the location area (e.g., whether indoors, outdoors or partly indoors and partly outdoors) and characteristics of the AP such as manufacturer and model. This additional information may be provided by LS 110 to one or more mobile devices (e.g., UE1, UE2 and UE3). The additional information may be provided in a compact form to reduce signaling, processing and data storage in LS 110 and/or in each recipient mobile device, as described further down herein. The additional information may be configured in LS 110 by an operator (e.g., based on known data for the deployed APs such as AP1, AP2 and AP3). Alternatively or in addition, the additional information may be provided to LS 110 or to a server which can transfer the information to LS 110 by the APs (e.g., AP1, AP2 and AP3) and/or by mobile devices (e.g., UE1, UE2 and UE3) using crowdsourcing.

Figure 2:
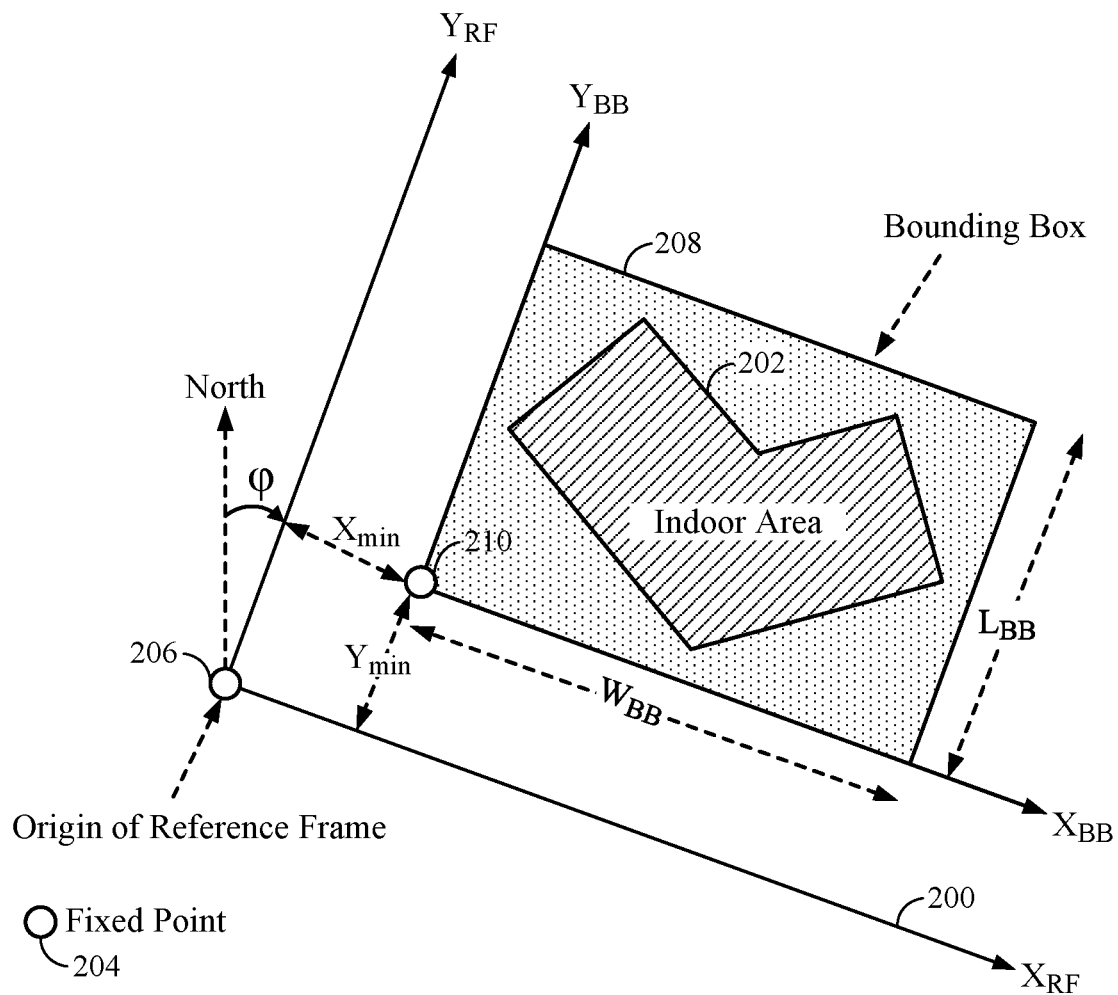
FIG. 2 illustrates an example bounding box that can be defined within or around a building, in accordance with certain embodiments of the present disclosure.

FIG. 2 illustrates an example reference frame 200 that can be defined to provide a local coordinate system and enable heat maps for some indoor (or outdoor) area 202 such a building, shopping mall, sports arena, and the like. The reference frame 200 may be used to define a set of grid points that may serve as the basis for determining heat maps for one or more access points. In FIG. 2, the location and orientation of the reference frame may be specified relative to a fixed point 204 whose location may be specified using absolute geographic coordinates (e.g., latitude, longitude and altitude) or by civic means (e.g., using a postal address and/or building designation such as "Main front entrance to shopping mall XYZ in city ABC" where XYZ and ABC are publicly known names). An origin 206 for the reference frame 200 may then be defined by relative displacements in directions North (or South), East (or West) and up (or down) from the fixed point 204. The reference frame may have horizontal and perpendicular X and Y coordinate axes, designated $X_{RF}$ and $Y_{RF}$, respectively, in FIG. 2, through the origin 206. Orientation of the reference frame is defined by a clockwise orientation angle φ between the direction of true North and the Y axis $Y_{RF}$. In one embodiment, a range of zero to 89 degrees may be used for φ. In another embodiment, the range of φ may be zero to 359 degrees.

The reference frame 200 in FIG. 2 may be used to define a horizontal and rectangular bounding box 208 containing grid points associated with an RF heat map for an AP. The sides of the bounding box 208 may be parallel to the $X_{RF}$ and $Y_{RF}$ axes of the reference frame 200. In FIG. 2, $W_{BB}$ represents the width of the bounding box 208 (parallel to the $X_{RF}$ axis) and $L_{BB}$ represents the length of the bounding box 208 (parallel to the $Y_{RF}$ axis). Within the reference frame 200, a horizontal rectangular grid of points (described later in association with FIG. 3) may be defined where rows of grid points are parallel to the $X_{RF}$ axis and columns of grid points are parallel to the $Y_{RF}$ axis. The distance between adjacent grid points along each row and along each column may be the same and fixed and may be used as the unit of length for other distances associated with the reference frame 200 such as the length $L_{BB}$ and the width $W_{BB}$ of the bounding box 208. One of the grid points may coincide with the origin 206 for the reference frame 200.

The position of the bounding box 208 may be defined relative to the reference grid 200 to include all or part of the coverage area of a particular AP and/or all or part of an area of interest such as indoor area 202. The bounding box 208 may have a local origin 210 which may be a corner of the bounding box with minimum X and Y coordinates (also referred to as offsets), shown as $X_{min}$ and $Y_{min}$ in FIG. 2. The values of $X_{min}$ and $Y_{min}$ in units of the fixed inter grid point spacing may each be exact integers, meaning that there may be one grid point exactly at the local origin 210. Local X and Y coordinate axes, $X_{BB}$ and $Y_{BB}$, through the local origin 210 may then be defined that are parallel to the coordinate axes, $X_{RF}$ and $Y_{RF}$, respectively, for the reference frame 200.

Figure 3:
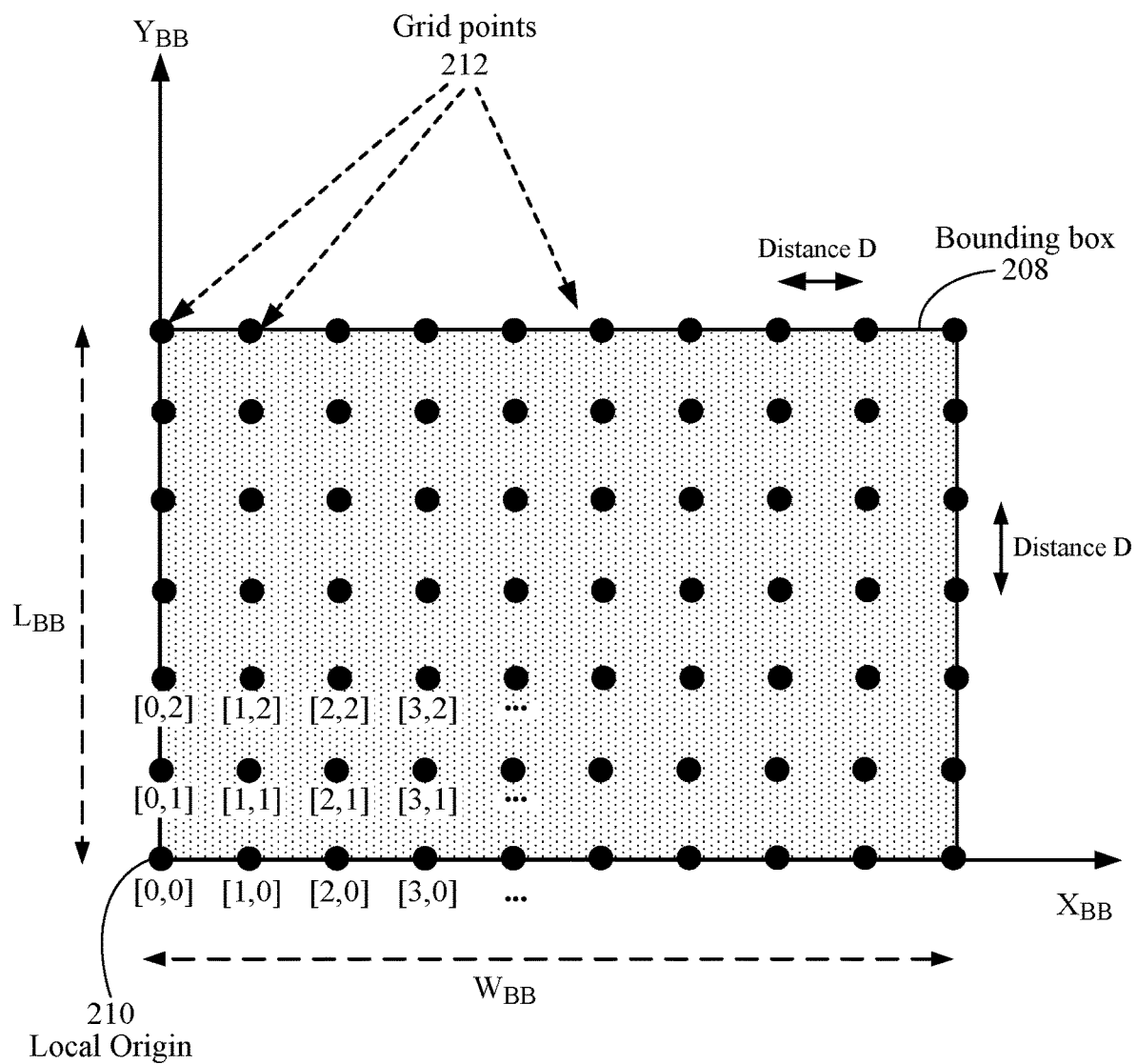
FIG. 3 illustrates an example set of grid points, in accordance with certain embodiments of the present disclosure.

FIG. 3 illustrates more details for the bounding box 208 in FIG. 2 and illustrates a set of grid points 212 that are within, or along the perimeters of the bounding box 208, in accordance with certain embodiments of the present disclosure. The set of grid points 212 may be defined relative to the reference frame 200 as described previously in association with FIG. 2. Thus, the grid points 212 may include one grid point at the local origin 210 of the bounding box 208 and additional grid points along rows and columns parallel to the local $X_{BB}$ and $Y_{BB}$ axes. The grid points 212 are separated by a fixed inter-grid point distance (or spacing) D. Since the length $L_{BB}$ and the width $W_{BB}$ of the bounding box 208 are each an integer multiple of the inter-grid point distance D, as described earlier for FIG. 2, the set of grid points 212 may include other grid points aligned with the other corners of the bounding box 208, as shown in FIG. 3, and grid points along and aligned with each of the four sides of bounding box 208, as further illustrated in FIG. 3. Grid points may each be assigned local coordinates [x,y] where x specifies the local X coordinate of the grid point along the local $X_{BB}$ axis in units of the distance D, and y specifies the local Y coordinate of the grid point along the local $Y_{BB}$ axis in units of the distance D. For example, the coordinates of the grid point at the local origin 210 will be [0,0] and with the coordinates of some other grid points nearby to the local origin 210 as also shown in FIG. 3. The inter-grid point distance D may be defined in units of decameters, meters, decimeters, or any other units. In certain embodiments, the distance between the grid points in X versus Y directions may be different, without departing from teachings of the present disclosure.

The set of grid points 212 in FIG. 3 may be used to provide signal characteristics (e.g., RSSI and/or RTT) for one or more APs (e.g., an AP or APs whose coverage area partly or completely overlaps with the bounding box 208). Values for each signal characteristic (e.g., mean RSSI, mean RTT) may be obtained by calculation and/or measurement for each of the grid points in the set of grid points 212. As described previously, if these values are provided (e.g., to a mobile device) without any compression or special encoding, the amount of data may be very large. Therefore, the values for each signal characteristic may be encoded and compressed.

Figure 4:
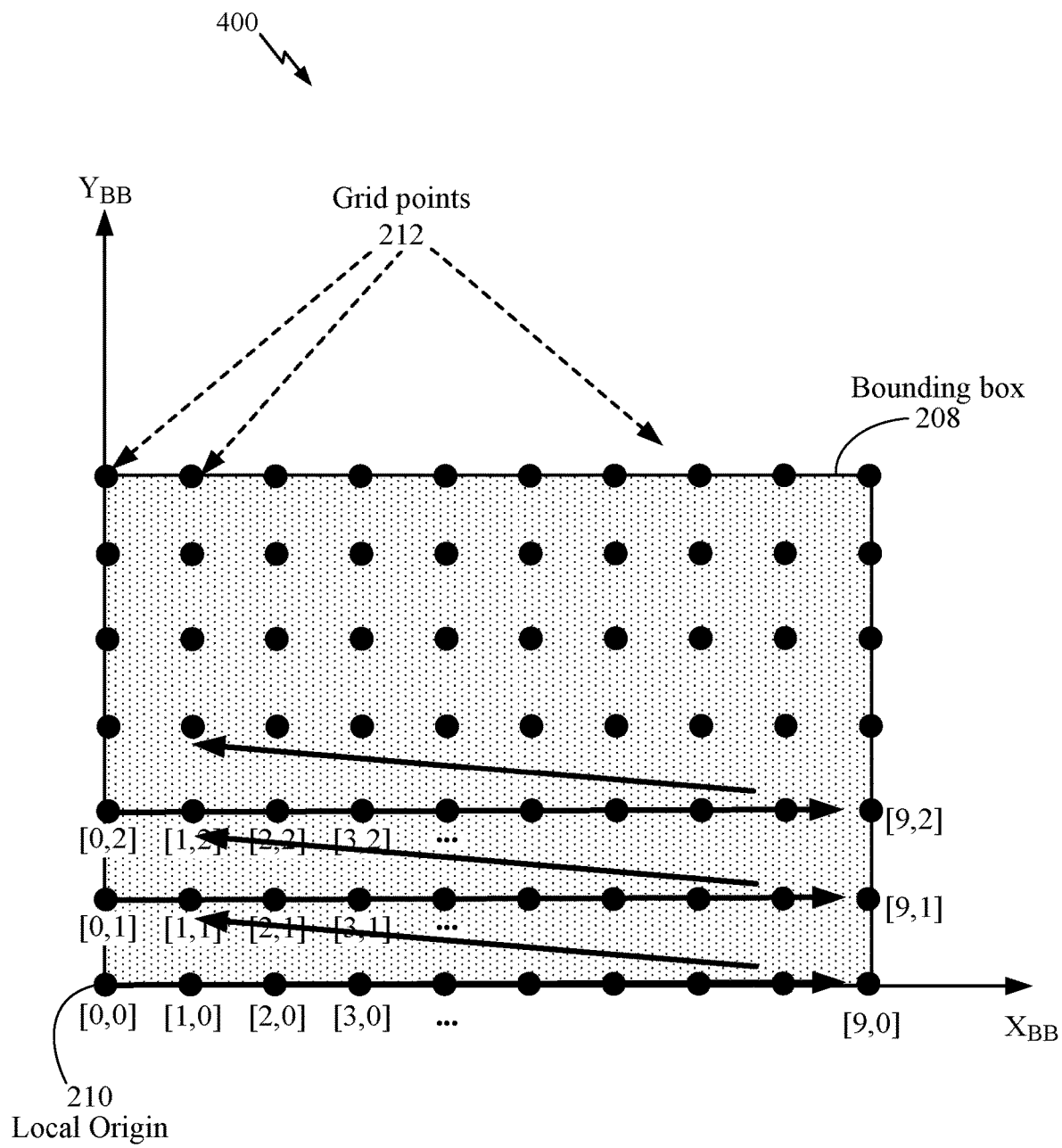
FIG. 4 illustrates an example scanning order for reading data corresponding to a set of grid points.
Figure 5:
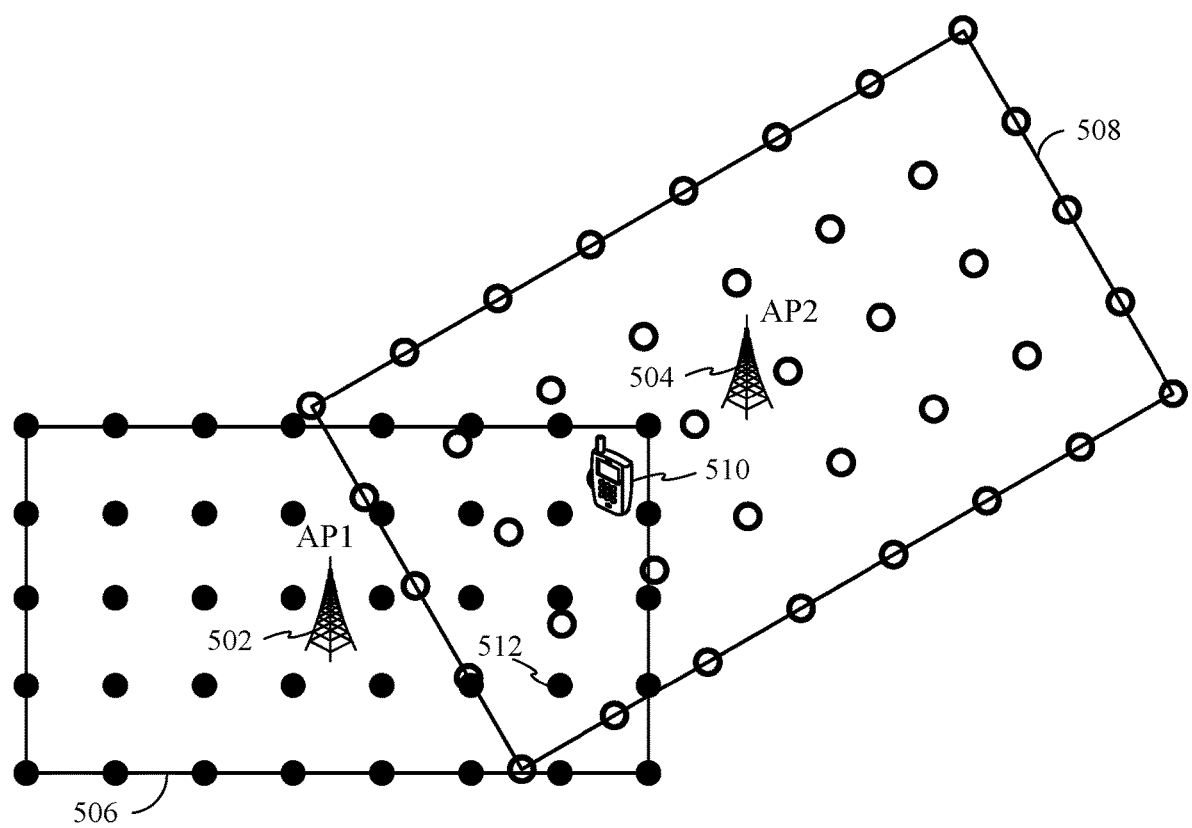
FIG. 5 illustrates two example APs with their corresponding heat maps, and a mobile device, in accordance with certain embodiments of the present disclosure.

One of the parameters associated with such encoding and compression may be the order in which signal values are compressed and encoded as defined by the order in which their associated grid points in the set of grid points 212 are scanned. FIGS. 4 and 5 illustrate two example scanning orders that may be used to scan the set of grid points 212. The scanned information may then be encoded and stored in a device and/or communicated with other devices.

FIG. 4 illustrates an example scanning order 400 for encoding data in a heat map (e.g., to encode mean RSSI and/or RSSI standard deviation values) using the set of grid points 212 illustrated in FIG. 3. As illustrated, scanning may start from the local origin 210 of the bounding box 208 which has local X and Y coordinates [0,0] and may continue along the local $X_{BB}$ axis and thus along the first and bottom row from left to right in this illustration. In this example, information may be obtained and encoded for the sequence of grid points with local coordinates [0,0], [1,0], [2,0], [3,0] and so on until the end of the row with coordinates [9,0] in this example is reached. When all the points on the first row of the grid are scanned, the grid points in the second row which have a local Y coordinate of 1 may be scanned starting from the leftmost grid point (on the local $Y_{BB}$ axis). When the end of this row is reached, grid points along the next row with a local Y coordinate of 2 may be scanned starting with the grid point at the left on the local $Y_{BB}$ axis. In the example shown in FIG. 4, the grid points may thus be scanned with the following order: [0,0], [1,0], [2,0], [3,0], . . . , [9,0], [0,1], [1,1], [2,1], . . . , [9,1], [0,2], [1,2], [2,2], [3,2] . . . . The last row to be scanned in this example would be the top row with a local Y coordinate of 6.

In one embodiment, RSSI values may be determined (e.g., by a location server such as location server 110) for each grid point in a set of grid points 212 within or along the perimeter of a bounding box 208 by either calculation and/or measurement. As an example, the RSSI values may be calculated based on a plurality of predetermined parameters, such as AP transmission power and antenna gain, AP location, building or other indoor structural layout, RF propagation physical laws, and the like. In another example, RSSI values may be measured by one or more mobile devices at different locations. The mobile devices may send the measured values to the location server for storage and/or further analysis. As an example, the location server may generate heat map information corresponding to a set of grid points 212 based on the measurements.

In one embodiment, the RSSI values may be encoded without compression for each grid point—e.g., using a single octet for each value expressing a value between 0 and 255, where the RSSI value V1 in units of decibel milliwatts (dBm) may be given by the encoded value V2 by some known relationship such as:

$$V1 = (127 - V2) dBm \qquad \text{Eqn (1)}$$

Next, the uncompressed values (e.g., the encoded values V2 for equation (1) may be scanned by scanning the associated grid points using a defined scanning order (e.g., as illustrated in FIG. 4). As each grid point is scanned, the uncompressed RSSI value (e.g., in the range 0 to 255 and encoded using 8 bits) corresponding to the grid point currently being scanned may be compressed to be stored in a smaller number of bits. The compressed bits may be added to one or more strings of bits representing the entire compressed heat map associated with the set of grid points 212 for the bounding box 208 and the particular AP.

Compression of RSSI values may be based on (i) obtaining a delta value for each grid point based on the difference between the RSSI value for the grid point and the RSSI value for the previous grid point in the scanning order; (ii) obtaining double delta values based on the differences between delta values for adjacent grid points; or (iii) use of JPEG compression. Details of delta and double delta compression techniques are disclosed in a co-pending patent application entitled "Techniques For Compressing RF Heat Maps For Access Points."

Aligning Heat Maps Corresponding to Different APs

Typically, each AP may have one or more unique heat maps providing expected (e.g., calculated or measured) RSSI or RTT values for a set of grid points corresponding to a bounding box. If a mobile device receives one or more heat maps for each of a plurality of APs (e.g., each heat map being defined with a bounding box and set of grid points that are unique for each AP), the mobile device may have to perform extra processing to align all the received information corresponding to different grid points.

FIG. 5 illustrates two example APs with their corresponding heat maps, and a mobile device in their vicinity. As illustrated, heat map 506 corresponds to AP1 502, and heat map 508 corresponds to AP2 504. A mobile device 510 (e.g., which may correspond to UE1 108 in FIG. 1) may receive heat map information for both AP1 and AP2—e.g., from a location server such as LS 110 in FIG. 1 (not shown in FIG. 5). The heat map 506 corresponding to AP1 overlaps with a portion of the heat map 508 corresponding to AP2. In this example, grid points associated with the two heat maps do not coincide in the overlapping area. As a result, extra processing may be needed to align heat map information corresponding to AP1 and AP2 in the overlapping area. For example, the mobile device 510 may wish to determine if it is at or near to the grid point 512 for the heat map 506. In order to accomplish this, the mobile device 510 may measure an RSSI value for the AP1 502 and compare the measured RSSI to the RSSI provided by the heat map 506 for the grid point 512. If the two RSSI values are the same or nearly the same, then the mobile device 510 may assume that it may be at or near to the grid point 512. But in order to verify this, the mobile device 510 may also need to measure an RSSI value for the AP2 504 and compare the measured RSSI to an RSSI provided by the heat map 508 for the location of the grid point 512. If the measured and provided RSSI values are the same or nearly the same, then the mobile device 510 may assume a higher probability of being at or near to the grid point 512. However, the heat map 508 does not contain a grid point corresponding to the grid point 512 in the heat map 506. Therefore, the mobile device 510 may have to infer an RSSI value for heat map 508 corresponding to the grid point 512 by interpolating between RSSI values for nearby grid points in the heat map 508 which may add extra processing and/or introduce errors (e.g., if interpolation is performed incorrectly). Therefore, it may be beneficial to align the heat maps for different APs (e.g., AP1 502 and AP2 504 in FIG. 5) by using a common bounding box and/or a common set of grid points for two or more APs. The common bounding box and/or common set of grid points could be optimized for a specific location. For example, the approximate location of the mobile device may be considered to be at the center of the set of grid points and/or the common bounding box. In another example, a common bounding box and a common set of grid points could be based on building geometry such as by aligning the X and Y axes for the common bounding box and grid points with the perpendicular sides of a rectangular shaped building.

In one embodiment, one or more common parameters may be defined for different sets of grid points corresponding to different APs. For example, different sets of grid points may have a common origin, common orientation, and/or common grid point spacing. In addition, one or more distinct parameters may be defined for the set of grid points corresponding to each AP. For example, a displacement of a local origin from the common origin in units of grid spacing in the X and Y directions, and/or a length and a width of a bounding box may be defined separately and uniquely for each AP. As a result, grid points for all grids corresponding to different APs may be aligned to a common "reference frame", also referred to as a common "reference grid". The common reference grid (or reference frame) may be defined based on the common origin, common orientation and common grid spacing parameters. Therefore, a mobile device may receive information (e.g., RSSI values) corresponding to different APs at any point on the reference grid.

FIG. 2 illustrates aspects of heat maps, grid points, bounding boxes and reference frames (or reference grids) that may be either common to a set of APs or distinct for each AP. In FIG. 2, the reference frame 200, also referred to herein as a reference grid, may be common to some or to all APs. The definition of the reference frame 200 that is common to some or all APs may include the location of the origin 206 relative to the fixed point 204, the location of the fixed point 204, the orientation φ of the $X_{RF}$ and $Y_{RF}$ axes and the inter-grid point distance D shown in FIG. 3. Conversely, for any AP, a particular bounding box and associated heat map values (e.g., mean RSSI values or mean RTT values) for each grid point may be unique to that AP. For example, the bounding box 208 shown in FIG. 2 including the offsets $X_{min}$ and $Y_{min}$ of the local origin 210 relative to the origin 206 and the length $L_{BB}$ and width $W_{BB}$ may be unique to just one AP or to some but not to all of the APs for which the reference frame 200 is common. Furthermore, signal characteristics (e.g., mean RSSI, mean RTT) that are measured or calculated for each grid point in the bounding box 208 (e.g., for each of the set of grid points 212 shown in FIG. 3) may be unique to a single AP. Consequently, any heat map derived from these signal characteristics that may be encoded with or without compression (e.g., compression based on delta values, double delta values or JPEG) may also be unique to a particular AP.

Figure 6:
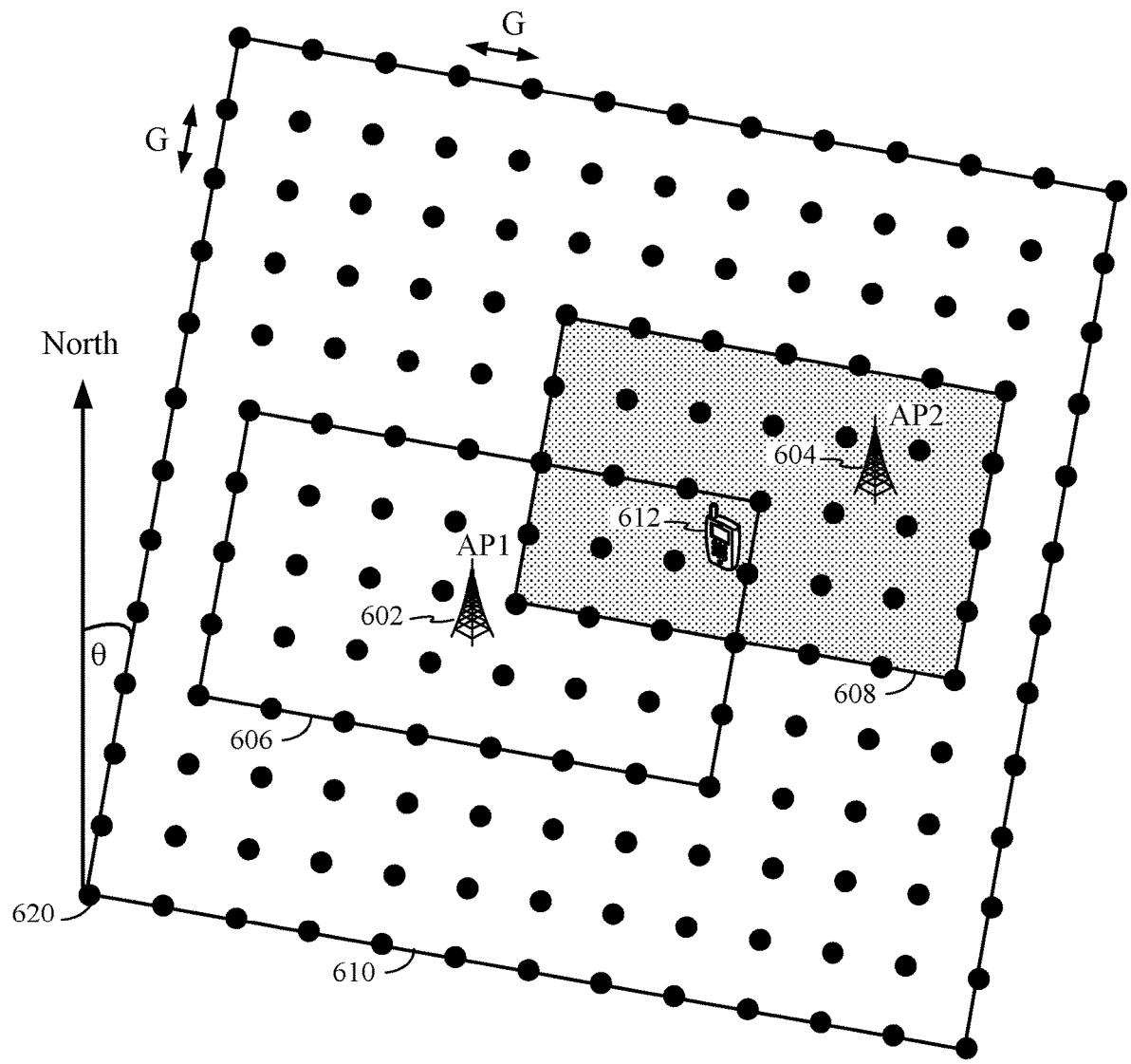
FIG. 6 illustrates an example common reference grid that may be used to provide heat map information corresponding to two or more APs, in accordance with certain embodiments of the present disclosure.

FIG. 6 illustrates another example of a common reference frame 610 (also referred to as a common reference grid) that may be used to provide heat map information corresponding to multiple APs. As illustrated, the reference frame 610 may have an origin 620 (e.g., whose location is defined relative to some fixed point not shown in FIG. 6), an orientation of θ relative to North and an inter-grid point spacing of G. The reference frame 610 may be used to define a bounding box and associated heat map information for AP1 602 and AP2 604. In the case of AP 602, the bounding box is 606 and in the case of AP 604, the bounding box is 608. The bounding boxes 606 and 608 are different but make use of the same set of grid points due to sharing the common reference frame 610. Therefore, the grid points in the bounding boxes 606 and 608 are aligned in the area where the bounding boxes overlap, thereby avoiding the problems of non-aligned grid points exemplified in FIG. 5 when heat maps associated with the bounding boxes are provided for each of the APs to some mobile device.

As discussed previously, there may be common information for two or more APs, such as a common reference frame (or common reference grid) and its various parameters and unique information for each AP such as a unique bounding box (and its various parameters) and a unique heat map (e.g., encoding mean RSSI or mean RTT associated with grid points within the bounding box). Both the common information and the unique information may be stored and maintained within a server, such as the location server 110 of FIG. 1. This information may be transferred to one or more mobile devices, such as UE1 108 in FIG. 1, when requested by a mobile device or when the server detects that a mobile device may be at a location where the information may be useful. A mobile device may use the information, after it has been transferred, to determine or help determine its location. For example, UE1 108 in FIG. 1 may receive from LS 110 a heat map encoding mean RSSI values for AP1 102, another heat map encoding mean RTT values for AP1 102 and similar pairs of heat maps for mean RSSI values and mean RTT values for AP2 104 and AP3 106. The UE1 108 may make measurements of the RSSI and/or RTT for each of the APs 102, 104 and 106 at some location and may compare the measured RSSI and/or measured RTT values to the expected RSSI values and/or expected RTT values for each of the APs 102, 104 and 106 as obtained from the heat maps received from LS 110. The UE1 108 may use the comparison to determine a probable location for UE1 108 where the measured and expected RSSI and RTT values most closely match one another.

In order to reduce storage, signaling and processing in LS 110 and UE1 108 and in order to reduce management of the data in LS 110 (e.g., by a program or human operator), the common information for APs 102, 104 and 106 (e.g., a common reference grid) may be stored and sent once only for all three APs. Conversely, the unique information for each of the APs 102, 104 and 106 (e.g., a definition of a bounding box for each AP and one or more heat maps defined relative to this bounding box) may be stored and sent individually for each AP. Similar treatment of common versus unique information may be applied to other types of information for the APs 102, 104 and 106 that may be sent to UE 108 to assist UE 108 in determining its location in order to reduce storage, signaling and processing and in order to make management of common information more efficient in LS 110.

In one embodiment, in order to achieve more efficient support for common information related to APs in a standard generic manner and avoid different conventions for defining and transferring common information, the use of group data may be employed. Group data may refer to data related to a group of two or more APs that is common to the APs in the group, but not necessarily common to APs that are not in the group. For any set of APs (e.g., all APs in a particular building), different groups of APs may be defined that have certain information in common. As an example, a group of APs could include all APs for which a common reference grid is used to define bounding boxes and heat maps as described earlier. A group of APs could also or instead include all APs on the same floor of a building (and thus all APs whose floor level in the building is the same), or all APs in the same portion of a building (e.g., all APs in the same terminal at an airport or all APs in the same wing of a hospital). A group of APs could also include all APs that share the same manufacturer and have the same model type. Information for a set of APs may then be structured into one or more sets of group data where each set of group data applies to a group of two or more APs. In addition to the group data, individual data may be defined that applies only to individual APs. The use of group data may significantly reduce the amount of data that needs to be uniquely stored and provided for each AP, thereby reducing data storage, signaling and processing and may also reduce management and configuration of data in a server.

Figure 7:
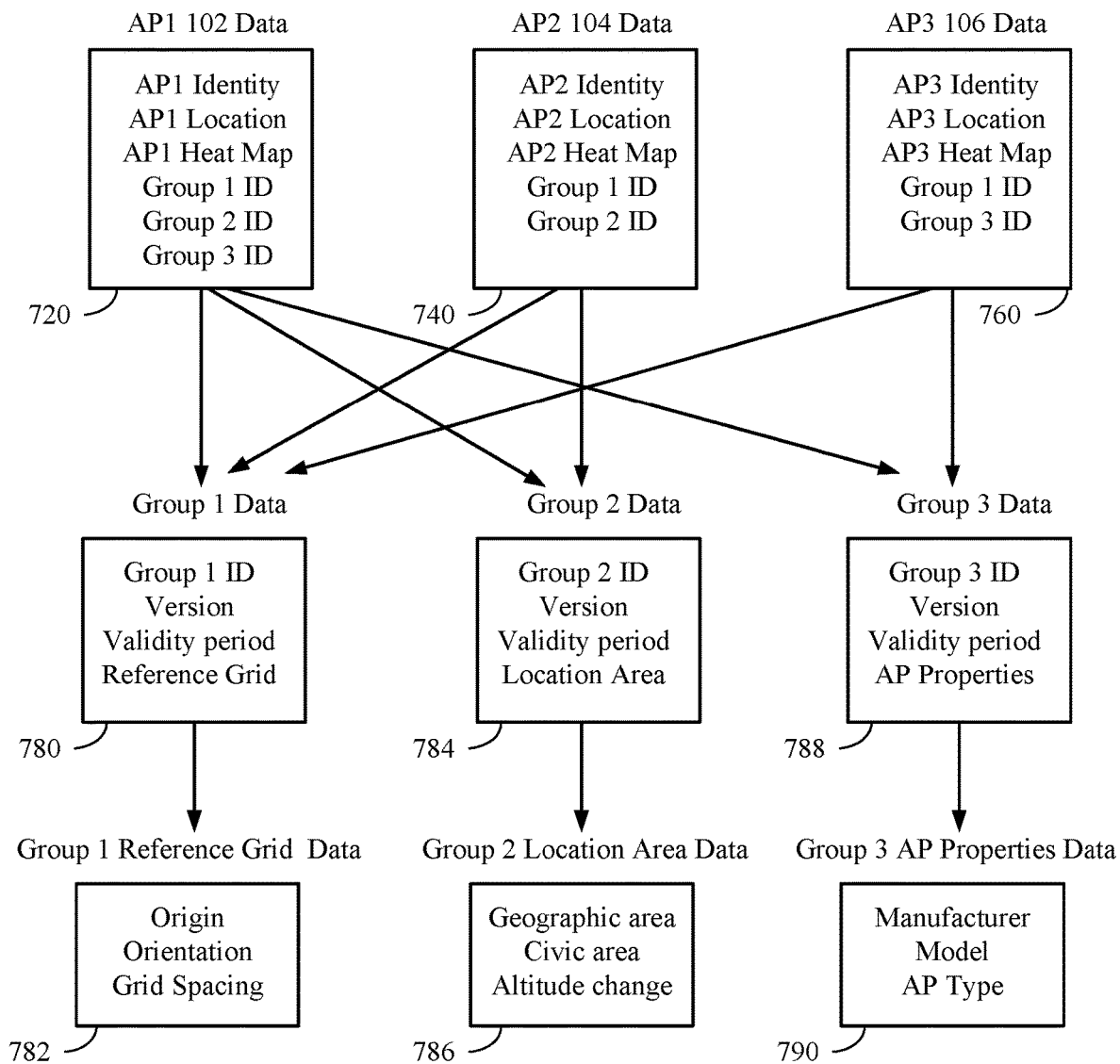
FIG. 7 illustrates several types of group data for an example set of APs, in accordance with certain embodiments of the present disclosure.

The use of group data is exemplified in FIG. 7 for the three APs 102, 104 and 106 in FIG. 1. FIG. 7 shows sets of data that may be defined, stored (e.g., in LS 110 or UE1 108) and transferred (e.g., from LS 110 to UE1 108). Each set of data is represented in FIG. 7 by a rectangular box and contains items that are summarized within each box. Some of the sets of data in FIG. 7 are unique to each AP and include data 720 for AP1 102, data 740 for AP2 104 and data 760 for AP3 106. Other sets of data in FIG. 7 apply to groups of two or more APs and include data 780 for a Group 1 of APs, data 784 for a Group 2 of APs and data 788 for a Group 3 of APs.

Group 1 includes all three APs 102, 104 and 106; Group 2 includes AP1 102 and AP2 104 but not AP3 106; and Group 3 includes AP1 102 and AP3 106 but not AP2 104. Group 1 data 780 includes data related to a common reference grid (or reference frame) and may include an identity for Group 1 (e.g., some number or name assigned to indicate Group 1), a version (e.g., a version number) that may be changed (e.g., incremented by one) whenever any data in the Group 1 data 780 changes, a validity period which may indicate a period of time over which the Group 1 data 780 may be considered valid by a recipient mobile device (e.g., UE1 108) and/or information for a reference grid.

The information for the reference grid may be included within Group 1 data 780 or may be separate but linked (as shown by the data 782 in FIG. 7) and may include the location of an origin, an orientation and an inter-grid point spacing. Group 2 data 784 includes data related to a common location area for a set of APs (e.g., APs 102 and 104 in the example of FIG. 7) and may identify a common coverage area for the APs or a common area containing part or all of the coverage area of each AP (e.g., one floor of a building or part of one floor of a building). Similar to Group 1 data 780, Group 2 data 784 may include an identity for Group 2 (e.g., a number or name that is different from the number or name used for the identity of Group 1), a version and/or a validity period. Unlike Group 1 data 780, Group 2 data 784 may include data related to a common location area which may be part of Group 2 data 784 or, as shown in FIG. 7, may be separate but linked to Group 2 data 784 in location area data 786.

Location area data 786 may include a description of a common coverage area for APs 102 and 104 or an area partly or completely containing the coverage areas for APs 102 and 104 that may include a geographic area description (e.g., for a circle, ellipse or polygon), a civic area description (e.g., the address and/or name of a building and a floor level and/or set of room or suite designations) and/or an indication of whether a mobile device is able to change its altitude (e.g., move up or down by one or more floors via stairs, an escalator or an elevator) from within the location area. An indication of whether or not an altitude change is possible from within the location area may assist a mobile device (e.g., UE1 108) that has the location area data to determine whether its altitude may have changed subsequent to entering the location area.

The location area data 784 or associated data 786 may also include other data such as: (i) a description of the type of location area (e.g., whether indoors, outdoors, or partly indoors and partly outdoors); (ii) a description of a particular type of indoor or outdoor area (e.g., walled office area, cubicle offices, high ceiling, large open space, parking garage, outdoor urban, outdoor suburban); (iii) a description of the horizontal coverage of the location area (e.g., the size of the location area as a percentage of the total contiguous horizontal area, such as a floor in a building, of which this location area is a part); (iv) a description of the vertical coverage of the location area (e.g., the percentage of the total number of floors or levels in a building or structure, including sub-levels, of which this location area is a part) and/or whether the location area has exterior access (e.g., such as exterior access from a location area within one building to another building via a doorway, opening or bridge).

Group 3 data 788 may include data similar to Group 1 data 780 and Group 2 data 784 including an identity for Group 3 (e.g., a number or name that is different from the numbers or names used for the identities of Group 1 and Group 3), a version and/or a validity period. Unlike Group 1 data 780 and Group 2 data 784, Group 3 data 788 may include common properties for the APs that are members of Group 3 which, in this example, include AP 102 and AP 106. The AP properties may be part of Group 3 data 788 or, as shown in FIG. 7 may be separate from but linked to Group 3 data 788 via the data 790. Data 790 may include the identification of a common manufacturer for APs 102 and 106, the identification of a common model of AP, the identification of a common chip manufacturer and/or chip model, and/or the identification of a common type of AP (e.g., an AP that supports IEEE 802.11a, 802.11g, 802.11n or a particular version of Bluetooth). The AP properties 790 may be useful to UE1 108 to help UE1 108 determine its location since the data may assist UE1 108 to predict the RSSI or RTT values for each AP in Group 3 (i.e., AP 102 and AP 106) at any particular distance from the AP and/or may assist UE1 108 to adjust or calibrate RSSI or RTT values received for AP 102 or AP 106 in a heat map (e.g., from LS 110).

As mentioned above, data provided to UE1 108 for APs 102, 104 and 106 may also include unique data for each AP as shown by data 720 for AP 102, data 740 for AP 104 and data 760 for AP 106. For each AP, the unique data may include the identity of the AP (e.g., a Media Access Control (MAC) address for the AP), the location of the AP (e.g., a latitude, longitude and altitude or a location expressed using X and Y coordinates using the common reference grid for the APs defined in reference grid data 782) and/or one or more heat maps for the AP (e.g., a heat map containing encoded values for mean RSSI or mean RTT) for grid points in a bounding box defined as part of the unique data for each AP or defined as part of the heat map. In addition, the unique data for each AP may identify the groups to which each AP belongs. Thus for example, the unique data 720 for AP 102 may include identifications for Groups 1, 2 and 3 since AP 102 belongs to each of these groups. Similarly, the unique data 740 for AP 104 may include identifications for Groups 1 and 2 but not Group 3, since AP 104 belongs to these two groups, and the unique data 760 for AP 106 may include identifications for Groups 1 and 3 but not Group 2, since AP 106 belongs to each of these groups.

By including identifications for each group in both the group data and the unique data for each AP, it is possible to indicate the groups that each AP belongs to and to associate the group data for these groups to the member APs. A mobile device that receives group data for a set of APs (e.g., receives Group 1 data 780, Group 2 data 784 and Group 3 data 788 as well as associated data 782, 786 and 790 in FIG. 7) from a location server such as LS 110 and/or from one or more APs (such as AP 102, 104 and/or 106 in FIG. 7) may use the data to determine or help determine vicinity related information for the APs. For example in the case of FIG. 7, a mobile device (e.g., UE1 108) that receives all the data illustrated and described earlier for FIG. 7 may use the data to determine RSSI and/or RTT values for each of the APs at different sets of grid points within the coverage area of each AP. The mobile device may further use this vicinity related information to determine or help determine its location based on measurements by the mobile device of RSSI and RTT for the different APs as described earlier.

Although FIG. 7 shows only three APs and data for three groups, the method may be extended to any number of APs and any number of groups. The groups shown in FIG. 7 define common data for a reference grid or reference frame (in the case of Group 1), common data for a location area (Group 2) and common data for AP properties (Group 3). But other types of common data may be defined and associated with APs by means of group data. In addition, certain types of group data may be repeated. For example, there may be (i) two or more sets of group data, denoted RG1, RG2, RG3 . . . , each defining a different reference grid; (ii) two or more sets of group data, denoted LA1, LA2, LA3 . . . , each defining a different location area and/or (iii) two or more sets of group data, denoted P1, P2, P3, . . . , each defining a different set of AP properties.

An AP may belong to one of each of the types of groups and thereby be associated with the corresponding group data. For example, an AP A1 may be associated with group data RG1, LA1 and P1, whereas another AP A2 may be associated with group data RG2, LA2 and P2. In addition, an AP may belong to more than one group of the same type and thereby be associated with more than one set of group data of the same type. Thus, in the previous example AP A1 may be associated with group data RG1 and group data RG2, while AP A2 may be associated with group data LA1 and LA2 and with group data P1 and P2. Allowing an AP to use more than one type of group data may provide an efficient means of defining additional data for the AP.

For example, in the case of an AP that is associated with two or more common reference grids, several different bounding boxes and associated heat maps may be defined—for example, a first bounding box and associated heat map with X and Y axes aligned North-South and East-West and a second bounding box and associated heat map covering almost the same area but oriented at say 45 degrees to the first bounding box. This may be useful to support heat maps that use the same reference grid—e.g., in the case of building with different sections where each building section needs its own reference grid. A mobile device that is in one section of the building can then be provided with heat maps for APs using the reference grid for the section of the building the mobile device is currently located in, thereby ensuring that the heat maps will all be aligned to the same set of grid points. Similarly, an AP may be associated with group data for two or more location areas, where data for a first location area may define (for example) a coverage area for the AP and data for a second location area may define (for example) a geographic area of importance within a building (e.g., a collection of adjacent gate areas at an airport) within which there is some possibility that the AP can be received. Further, an AP may be associated with group data for different sets of AP properties, where a first set of group data may (for example) provide details about the AP manufacturer while a second set of AP data may (for example) provide details about the signal types supported by an AP.

Some further examples of using group data are now described. In one example, a set of APs in an airport may be distributed over two different terminals (e.g., terminal A and terminal B). One or more heat maps (e.g., for RSSI or RTT values) may be assembled for each of the APs based on a reference grid associated with terminal A in the case of APs in terminal A, or based on a reference grid associated with terminal B in the case of APs in terminal B. The two reference grids may include one type of group data for the set of APs and other types of group data may be defined to provide other common data for some or all of the APs, such as common data for a location area and common AP properties.

For example, group data A1 and A2 may be defined for some or all of the APs that are located in terminal A and group data B1, B2 and B3 may be defined for some or all of the APs that are located in terminal B of the airport. Group data A1 may define a common reference grid associated with terminal A for APs in terminal A and group data A2 may define a common location area (e.g., the geographic area for terminal A) for APs in terminal A. Similarly, group data B1 may define a common reference grid associated with terminal B for APs in terminal B, group data B2 may define a common location area (e.g., the geographic area for terminal B) for APs in terminal B and group data B3 may define common properties (e.g., manufacturer, model) for APs in terminal B. Another set of group data, group data C, may be defined for APs in both terminals A and B if there is any data common to all of the terminals—e.g., data related to support of a common IEEE 802.11 or Bluetooth signaling standard.

In one embodiment, an AP may belong to multiple groups, each group being different in terms of one or more characteristics. For example, in a building, different location area groups (such as location area Group 2 in FIG. 7) may be defined for different floors (first floor group, second floor group, etc.). In one embodiment, a location server ensures that all the APs that are identified as being a part of each group share a common floor level. In one embodiment, information corresponding to each group includes an indication of whether a change of altitude within the shared area is possible.

In one embodiment, an AP may belong to more than one location area group—e.g., if location areas partially overlap. In the example of FIG. 7, this could mean that AP 102 belongs to both Group 2 containing data for one location area and another group (not shown in FIG. 7) containing data for some other location area. A mobile device and a location server may use location area groups to help determine when assistance data for additional APs needs to be sent to the mobile device. For example, if a mobile device reports visible APs belonging to certain location area groups, the location server may provide assistance data for these APs and other APs in the same location area group. If a mobile device detects APs that do not belong to any known location area groups, the mobile device may request assistance data for these APs and may expect to receive data for these APs and possibly for other APs in the same location area groups as these APs.

In one embodiment, a mobile device may communicate with an AP and receive an access point group identifier from the AP. The mobile device may obtain a plurality of characteristics corresponding to the AP based on the received group identifier from a data base (e.g., located at the mobile device and/or a location server). In one embodiment, assistance data may be provided to a mobile device for a group of APs. Assistance data may be provided in the form of group data that is common to all APs in the group. The group data may be associated with a group ID. As an example, in the case of UE1 108 and AP 102 in FIG. 1, UE1 108 may communicate with AP 102 and receive the identity of the Group 1, the Group 2 and/or the Group 3 shown in FIG. 7 from AP 102. UE1 108 may then obtain the Group 1 data 780, the Group 2 Data 784 and/or the Group 3 Data 788, as well as the data associated with each group including data 782, data 786 and/or data 790 from a server such as LS 110.

In another embodiment, a mobile device such as UE1 108 may request assistance data from a location server, such as LS 110, by sending a message to the location server (e.g., a message conforming to the SUPL location solution and/or to LPPe, and the like). The message may provide group IDs and group version numbers that identify the group data that the mobile device already has (e.g., by previous transfer from the location server). The message may further identify APs (e.g., using a MAC address for each AP) for which the mobile device has already received individual unique data from the location server. The message may also provide an approximate location for the mobile device and/or may identify one or more APs (e.g., using their MAC addresses) currently or recently visible to the mobile device.

The location server may then send unique AP data to the mobile device for one or more APs and/or may send one or more sets of group data applicable to these APs and/or to other APs. The unique AP data may be for APs nearby to the approximate location of the mobile device and/or for APs indicated as being visible or recently visible to the mobile device. The group data may be for groups of APs that include APs for which unique data is sent to the mobile device and/or that include APs nearby to the approximate location of the mobile device and/or that include APs visible to or recently visible to the mobile device.

In an embodiment, the location server may refrain from sending unique data for APs for which the mobile indicated it already has the unique data. In a further embodiment, the location server may refrain from sending group data to the mobile device for groups for which the mobile device indicated it already has data. However, if the mobile device indicates it has group data associated with a particular group ID and version, a location server may send new group data if the version indicated by the mobile device is no longer the most recent version for this group and if the group data has changed significantly. In some embodiments, a location server may send unique AP data and/or group data to a mobile device (e.g., using SUPL and/or LPPe) without receiving a request from the mobile device. For example, a location server may send unique data and/or group data for APs in a certain part of a building to a mobile device when measurements (e.g., AP measurements) or a location estimate sent by the mobile device to the location server indicate that the mobile device is within or nearby to this part of the building (e.g., such as when a user of the mobile device uses an elevator to travel to a new floor in a building and the mobile device has little or no data for APs present on this new floor).

As a particular example of such updating of data for APs and referring to FIGS. 1 and 7, the UE1 108 may have data 720 for AP 102 and Group 1 data 780 and linked data 782 but may not have data for APs 104 and 106 or Group 2 data 784 or Group 3 data 788. UE1 108 may then send a request for more AP data to LS 110 and may indicate that it has data for AP 102 and has data for Group 1. UE1 108 may further provide a location estimate and/or indicate that AP 104 and/or AP 106 are visible. Based on this request, LS 110 may then send to UE1 108 data 740 for AP 104, data 760 for AP 106, Group 2 data 784 (and linked data 786) and Group 3 data 788 (and linked data 790). UE1 108 may then use the data to determine or help determine its location at the current time and/or at a later time. For example, UE1 108 may use RSSI and/or RTT heat maps received as part of AP 104 data 740 and AP 106 data 760 combined with common reference grid data from Group 1 data 780 (and linked data 782) to help determine its location from RSSI and/or RTT measurements by UE1 108 of APs 104 and 106.

Group data of the type described previously and exemplified in FIG. 7 may or may not be hierarchical. For example, four APs denoted A, B, C and D, may be associated with three different sets of group data G1, G2 and G3, where G1 provides group data for all four APs (A, B, C and D), G2 provides group data for APs A and B (but not for APs C and D), and G3 provides group data for APs C and D (but not for APs A and B). In this example, the data may form a hierarchy starting with group data G1 which applies to all APs, then proceeding to group data G2 and G3 which each provide data for different non-overlapping sets of APs (A and B in one set and C and D in the other set) and finally proceeding to any unique data for each of the individual APs A, B, C, and D that may not be common to any of the other APs.

In another example, similar to the previous one, four APs denoted A*, B*, C* and D*, may be associated with three different sets of group data G1*, G2* and G3*, where G1* provides group data for all four APs (A*, B*, C* and D*), G2* provides group data for APs A*, B* and C* (but not for AP D*), and G3* provides group data for APs B*, C* and D* (but not for AP A*). In this example, the data may not form a hierarchy starting with group data G1* which applies to all APs (A*, B*, C* and D*), because group data G2* and group data G3* provide data for two sets of APs (A*, B* and C* in one set and B*, C* and D* in the other set) that are different sets but also overlapping sets (due to inclusion of APs B* and C* in both sets). Support of different but overlapping sets is not a normal feature of a hierarchy. By allowing both hierarchical and non-hierarchical data association, the group data method may provide extra flexibility in providing assistance data for APs to a mobile device.

Figure 8:
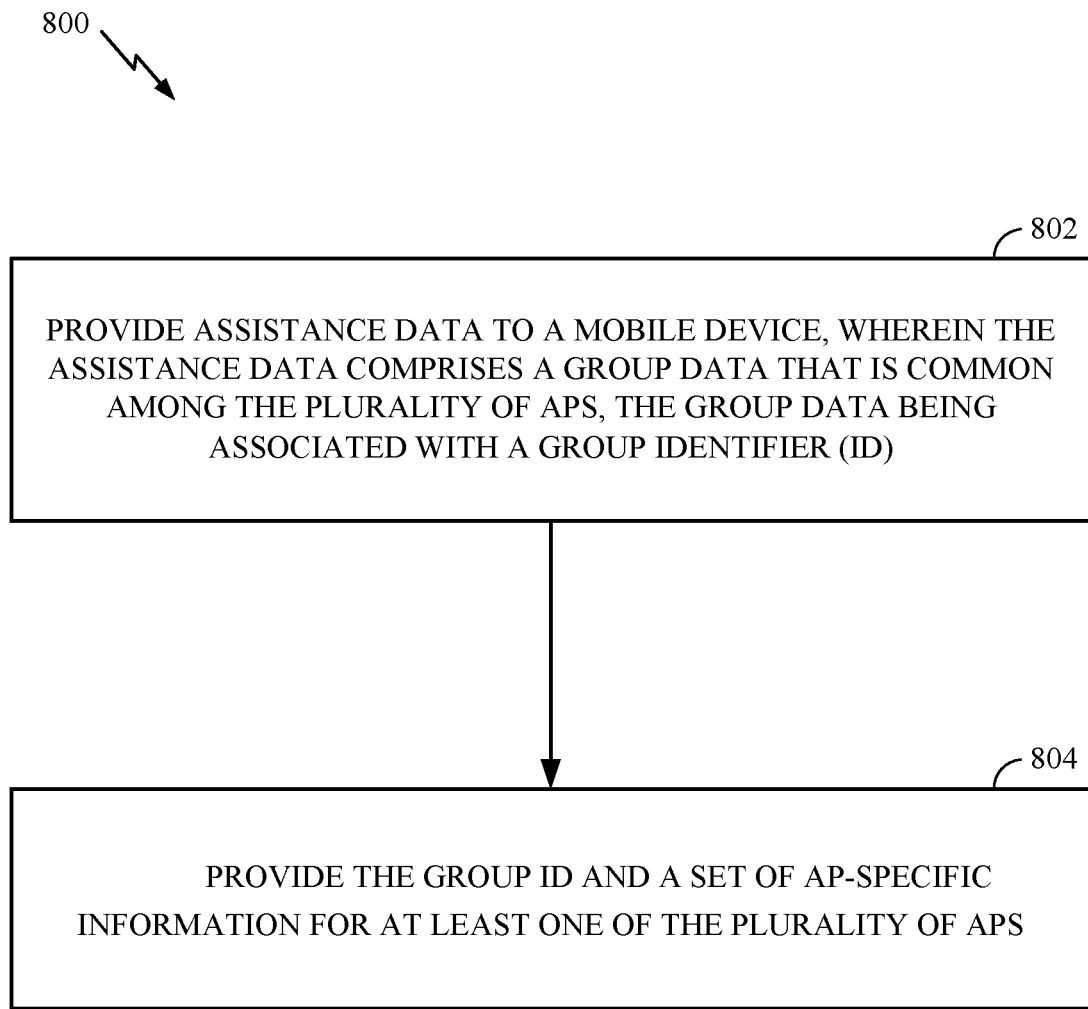
FIG. 8 illustrates example operations that may be performed by a device to provide assistance data corresponding to two or more APs, in accordance with certain embodiments of the present disclosure.

FIG. 8 illustrates example operations 800 that may be performed by a device to provide assistance data corresponding to a plurality of APs (e.g., APs 102, 104 and 106). For example, the device may be a location server such as LS 110. At 802, the device provides first assistance data to a mobile device such as UE1 108. The first assistance data may include first group data that is common among the plurality of APs. Moreover, the first group data is associated with a first group ID.

The device may determine the first group data by analyzing one or more characteristics of the first plurality of APs. In one example, the first group data includes information corresponding to a common location area for the plurality of APs. In another example, the first group data includes an indication of whether an altitude change is allowed within the common location area. In yet another example, the first group data includes information corresponding to a reference grid that may be used in determining the set of AP-specific information. In addition, the first group data may include a version and a period during which the data is valid. The first group data may also include some of the common properties of APs, such as an identification of the AP manufacturer, AP model, a chip manufacturer, a chip model, a signaling type and any other properties.

Referring back to FIG. 8, at 804, the device provides the first group ID and a set of AP-specific information for at least one of the plurality of APs. The plurality APs may comprise WiFi APs, Bluetooth APs, small cells, Femto cells and/or other types of APs and the assistance data may be provided at 802 and 804 using SUPL, LPPe and/or any other signaling protocol.

The device may also provide a second set of assistance data to the mobile device corresponding to a second plurality of APs. The second assistance data may be different from the first assistance data. The second assistance data may include a second group data that is common among the second plurality of APs. The second group data may be associated with a second group ID. In one example, the second plurality of APs may include at least one of the APs in the first plurality of APs. In addition, the device may provide the second group ID to the mobile device. In one embodiment, at least one of the APs in the first plurality of APs or in the second plurality of APs is not in both the first and the second plurality of APs.

Figure 9:
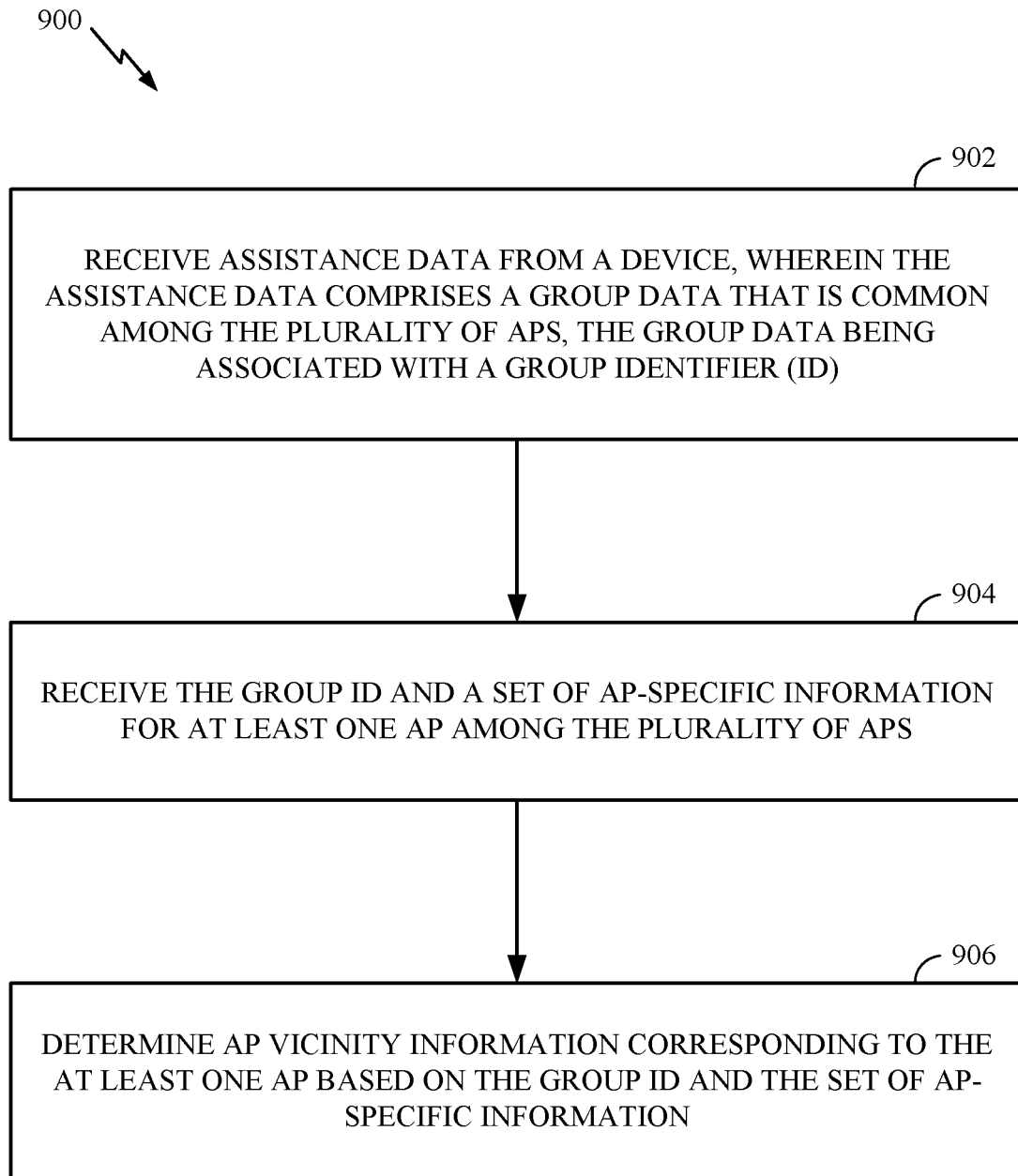
FIG. 9 illustrates example operations that may be performed by a mobile device to obtain assistance data corresponding to a plurality of APs.

FIG. 9 illustrates example operations 900 that may be performed by a mobile device (e.g., UE1 108) to obtain assistance data corresponding to a plurality of APs (e.g., APs 102, 104 and 106). At 902, the mobile device receives first assistance data from a device (e.g., a location server such as LS 110). The first assistance data may include first group data that is common among the plurality of APs. The first group data may be associated with a first group ID. At 904, the mobile device receives the first group ID and a set of AP-specific information for at least one AP among the plurality of APs. At 906, the mobile device determines AP vicinity information corresponding to the at least one AP based on the first group ID and the set of AP-specific information. The plurality APs may comprise WiFi APs, Bluetooth APs, small cells, Femto cells and/or other types of APs and the assistance data may be received at 902 and 904 using SUPL, LPPe and/or some other signaling protocol.

The mobile device may also receive second assistance data corresponding to a second plurality of APs. The second assistance data may be different from the first assistance data. The second assistance data may include a second group data that is common among the second plurality of APs. The second group data may be associated with a second group ID. In one example, the second plurality of APs may include at least one of the APs in the first plurality of APs. In one embodiment, at least one of the APs in the first plurality of APs or in the second plurality of APs is not in both the first and the second plurality of APs.

Figure 10:
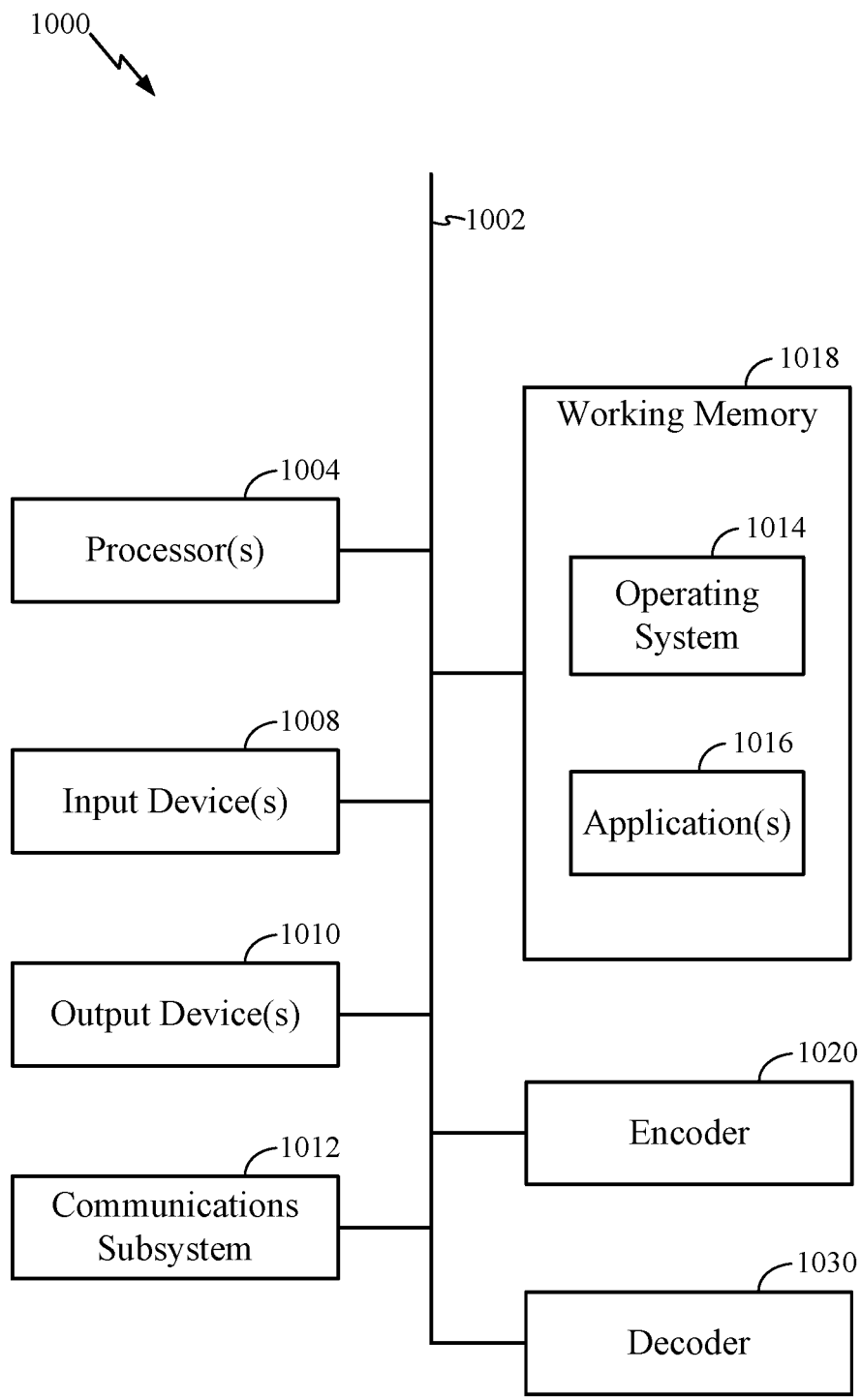
FIG. 10 describes one potential implementation of a device which may be used to provide and/or utilize vicinity information, according to certain embodiments.

FIG. 10 describes one potential implementation of a device 1000 which may be used to provide or receive AP vicinity information, according to certain embodiments. The device 1000 may be a mobile device such as UE1 108 in FIG. 1 or a location server such as location sever 110 in FIG. 1. In the embodiment of device 1000 shown in FIG. 10, specialized modules such as encoder 1020 may perform any type of encoding of heat maps based on delta encoding, double delta encoding, JPEG or the like. Device 1000 may also or instead perform decoding of AP vicinity information using a decoder 1030—e.g., if device 1000 is a mobile device. These modules may be implemented to interact with various other modules of device 1000. Memory 1018 may be configured to store data regarding heat maps, and may also store settings and instructions regarding grid orientation, spacing, etc. Memory 1018 may also store data unique to one or more APs (such as unique AP data 720, 740 and 780 illustrated in FIG. 7) and/or group data such as Group 1 data 780, Group 2 data 784 and Group 3 data 788 shown in FIG. 7 (as well as linked data 782, 786 and 790).

In the embodiment shown at FIG. 10, the device 1000 may be a mobile device or a location server and include processor 1004 configured to execute instructions for performing operations at a number of components and can be, for example, a general-purpose processor or microprocessor suitable for implementation within a portable electronic device. Processor 1004 is communicatively coupled with a plurality of components within device 1000. To realize this communicative coupling, processor 1004 may communicate with the other illustrated components across a bus 1002. Bus 1002 can be any subsystem adapted to transfer data within device 1000. Bus 1002 can be a plurality of computer buses and include additional circuitry to transfer data.

Memory 1018 may be coupled to processor 1004. In some embodiments, memory 1018 offers both short-term and long-term storage and may in fact be divided into several units. Short term memory may store data which may be discarded after an analysis, or all data may be stored in long term storage depending on user selections. Memory 1018 may be volatile, such as static random access memory (SRAM) and/or dynamic random access memory (DRAM) and/or non-volatile, such as read-only memory (ROM), flash memory, and the like. Furthermore, memory 1018 can include removable storage devices, such as secure digital (SD) cards. Thus, memory 1018 provides storage of computer readable instructions, data structures, program modules, and other data for mobile device 1000. In some embodiments, memory 1018 may be distributed into different hardware modules.

In some embodiments, memory 1018 stores software code for a plurality of applications 1016. Applications 1016 contain particular instructions to be executed by processor 1004. In alternative embodiments, other hardware modules may additionally execute certain applications or parts of applications. Memory 1018 may be used to store computer readable instructions for modules that implement scanning according to certain embodiments, and may also store compact object representations as part of a database.

In some embodiments, memory 1018 includes an operating system 1014. Operating system 1014 may be operable to initiate the execution of the instructions provided by application modules and/or manage other hardware modules as well as interfaces with communication modules which may use communications subsystem 1012 which may support wireless communication (e.g., in the case device 1000 is a mobile device) and/or communication via wireline links and intermediate networks (e.g., in the case device 1000 is a location server). Operating system 1014 may be adapted to perform other operations across the components of mobile device 1000, including threading, resource management, data storage control and other similar functionality.

In some embodiments, device 1000 includes a plurality of other hardware modules (e.g., encoder 1020, decoder 1030). Each of the other hardware modules is a physical module within device 1000. However, while each of the hardware modules is permanently configured as a structure, a respective one of hardware modules may be temporarily configured to perform specific functions or temporarily activated.

Other embodiments may include sensors integrated into device 1000. An example of a sensor can be, for example, an accelerometer, a wi-fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the sensors may be implemented as hardware, software, or firmware. Further, as described herein, certain hardware modules such as the accelerometer, the GPS module, the gyroscope, the inertial sensor, or other such modules may be used in conjunction with the camera and image processing module to provide additional information. In certain embodiments, a user may use a user input module 1008 to select how to analyze the heat maps.

Device 1000 may include a component such as a communication module 1012, as mentioned above, which may enable device 1000 to communicate with other entities (e.g., APs such as APs 102, 104 and 106 in FIG. 1, other entities in a network such as entities in wireless network 120 in FIG. 1, LS 110 in the case that device 1000 is a mobile device and/or UE1 108 in the case that device 1000 is a location server such as LS 110) via wireless or wireline means. Communications module 1012 may support wireless communication (e.g., if device 1000 is a mobile device) and may then integrate an antenna and wireless transceiver with any other hardware, firmware, or software necessary for wireless communications. Such a wireless communication module may be configured to receive signals from various devices such as data sources via networks and access points such as a network access point.

In addition to other hardware modules and applications in memory 1018, device 1000 may have a display output 1010 and a user input module 1008. Display output 1010 graphically presents information from device 1000—e.g., to the user in the case that device 1000 is a mobile device. This information may be derived from one or more application modules, one or more hardware modules, a combination thereof, or any other suitable means for resolving graphical content for the user (e.g., by operating system 1014). Display output 1010 can be liquid crystal display (LCD) technology, light emitting polymer display (LPD) technology, or some other display technology. In some embodiments, display module 1010 is a capacitive or resistive touch screen and may be sensitive to haptic and/or tactile contact with a user. In such embodiments, the display output 1010 can comprise a multi-touch-sensitive display. Display output 1010 may then be used to display any number of outputs associated with a camera or image processing module such as alerts, settings, thresholds, user interfaces, or other such controls.

In the case that device 1000 is a location server (e.g., LS 110 in FIG. 1), software or firmware instructions in memory 1018 may be executed on processor 1004 to enable device 1000 to perform the example operations 800 of FIG. 8 and to transfer unique AP data and group data for APs to a mobile device (e.g., to UE1 108 in FIG. 1) using SUPL, LPPe or some other signaling protocol. In the case that device 1000 is a mobile device (e.g., UE1 108 in FIG. 1), software or firmware instructions in memory 1018 may be executed on processor 1004 to enable device 1000 to perform the example operations 900 of FIG. 9 and to receive unique AP data and group data for APs from a location server (e.g., LS 110 in FIG. 1) using SUPL, LPPe or some other signaling protocol.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes which may be depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application of various embodiments, and any number of steps may be undertaken before, during, or after the elements of any embodiment are implemented.

Having described several embodiments, it will therefore be clear to a person of ordinary skill that various modifications, alternative constructions, and equivalents may be used without departing from the spirit of the disclosure.

What is claimed is:

1. A method for providing assistance data corresponding to a plurality of access points (APs), comprising:
   receiving a request from a mobile device for the assistance data, wherein the assistance data relates to at least one AP of the plurality of APs, and the request includes:
   one or more group identifiers (IDs) previously received by the mobile device,
   an identity of the at least one AP, or
   an indication of an approximate location of the mobile device, or a combination thereof;
responsive to receiving the request, providing assistance data to the mobile device, wherein the assistance data comprises information indicative of least one characteristic that is common among all APs of the plurality of APs, wherein:
the information indicative of the at least one characteristic is associated with a group ID,
the group ID is assigned to each AP of the plurality of APs, and
the information indicative of the at least one characteristic comprises an identification of:
an AP manufacturer,
an AP model,
a chip manufacturer, or
a chip model, or
a combination thereof; and
providing the group ID and a set of AP-specific information for at least one of the plurality of APs;
wherein the information indicative of at least one characteristic comprises information corresponding to a reference grid, wherein the reference grid is used in determining the set of AP-specific information, and wherein the reference grid comprises one or more grid points associated with a signal characteristics for a first AP of the plurality of APs; and
wherein:
(i) the reference grid comprises a plurality of grid points, and wherein one or more grid points of the plurality of grid points is associated with a second AP of the plurality of APs; or
(ii) the reference grid defines a bounding box, the bounding box defining first and second reference axes that intersect, and wherein each of the one or more grid points has a coordinate based on the first and second reference axes; or
a combination thereof.

2. The method of claim 1, wherein the reference grid defines the bounding box, and the one or more grid points are arranged according to rows and columns, wherein each row is parallel to a first reference axis and each column is parallel to a second reference axis.

3. The method of claim 1, wherein the reference grid defines the bounding box, and each coordinate comprises a local coordinate with respect to the reference grid, and wherein the reference grid is defined with respect to a fixed point.

4. The method of claim 3, wherein the fixed point has at least one of an absolute geographic coordinate or a specified civic location.

5. The method of claim 1, wherein the one or more grid points have a common grid point spacing, common grid origin, or a common grid orientation, or a combination thereof.

6. A device comprising:
a communication subsystem;
a memory; and
a processor communicatively coupled to the communication subsystem and the memory, the processor configured to:
receive a request from a mobile device for assistance data relating to at least one access point (AP) of a plurality of APs, wherein the request includes:
one or more group identifiers (IDs) previously received by the mobile device,
an identity of the at least one AP, or
an indication of an approximate location of the mobile device, or
a combination thereof;
responsive to receiving the request, provide assistance data to the mobile device, wherein the assistance data comprises information indicative of at least one characteristic that is common among all APs of the plurality of APs, wherein:
the information indicative of the at least one characteristic is associated with a group ID,
the group ID is assigned to each AP of the plurality of APs, and
the information indicative of the at least one characteristic comprises an identification of:
an AP manufacturer,
an AP model,
a chip manufacturer, or
a chip model, or
a combination thereof; and
provide the group ID and a set of AP-specific information for at least one of the plurality of APs;
wherein the information indicative of at least one characteristic comprises information corresponding to a reference grid, wherein the reference grid is used in determining the set of AP-specific information, and wherein the reference grid comprises one or more grid points associated with a signal characteristics for a first AP of the plurality of APs; and
wherein:
(i) the reference grid comprises a plurality of grid points, and wherein one or more grid points of the plurality of grid points is associated with a second AP of the plurality of APs;
(ii) the reference grid defines a bounding box, the bounding box defining first and second reference axes that intersect, and wherein each of the one or more grid points has a coordinate based on the first and second reference axes; or
a combination thereof.

7. The device of claim 6, wherein the reference grid defines the bounding box, and the one or more grid points are arranged according to rows and columns, wherein each row is parallel to a first reference axis and each column is parallel to a second reference axis.

8. The device of claim 6, wherein the reference grid defines the bounding box, and each coordinate comprises a local coordinate with respect to the reference grid, and wherein the reference grid is defined with respect to a fixed point.

9. The device of claim 8, wherein the fixed point has at least one of an absolute geographic coordinate or a specified civic location.

10. The device of claim 6, wherein the one or more grid points have a common grid point spacing, common grid origin, or a common grid orientation, or a combination thereof.

11. A method for obtaining assistance data corresponding to a plurality of access points (APs), comprising:
sending a request to a device for the assistance data, wherein the assistance data relates to at least one AP of the plurality of APs, and the request includes:
one or more group identifiers (IDs) previously received by a mobile device,
an identity of the at least one AP, or
an indication of an approximate location of the mobile device, or
a combination thereof;

subsequent to sending the request, receiving assistance data from the device, wherein the assistance data comprises information indicative of at least one characteristic that is common among all APs of the plurality of APs, wherein:
  the information indicative of the at least one characteristic is associated with a group ID,
  the group ID is assigned to each AP of the plurality of APs, and
  the information indicative of the at least one characteristic comprises an identification of:
    an AP manufacturer,
    an AP model,
    a chip manufacturer, or
    a chip model, or
    a combination thereof;
receiving the group ID and a set of AP-specific information for at least one AP among the plurality of APs; and
determining AP vicinity information corresponding to the at least one AP based on the group ID and the set of AP-specific information;
wherein the information indicative of at least one characteristic comprises information corresponding to a reference grid, wherein the reference grid is used in determining the set of AP-specific information, and wherein the reference grid comprises one or more grid points associated with a signal characteristics for a first AP of the plurality of APs; and
wherein:
  (i) the reference grid comprises a plurality of grid points, and wherein one or more grid points of the plurality of grid points is associated with a second AP of the plurality of APs; or
  (ii) the reference grid defines a bounding box, the bounding box defining first and second reference axes that intersect, and wherein each of the one or more grid points has a coordinate based on the first and second reference axes; or
  a combination thereof.

12. The method of claim 11, wherein the reference grid defines the bounding box, and the one or more grid points are arranged in rows and columns, wherein each row is parallel to a first reference axis and each column is parallel to a second reference axis.

13. The method of claim 11, wherein the reference grid defines the bounding box, and each coordinate comprises a local coordinate with respect to the reference grid, and wherein the reference grid is defined with respect to a fixed point, and wherein the fixed point has at least one of an absolute geographic coordinate or a specified civic location.

14. A device comprising:
a transceiver;
a memory; and
a processor communicatively coupled to the transceiver and the memory, the processor configured to:
  send a request to a remote device for assistance data relating to at least one access point (AP) of a plurality of APs, wherein the request includes:
    one or more group identifiers (IDs) previously received by the device,
    an identity of the at least one AP, or
    an indication of an approximate location of the device, or
    a combination thereof;
  subsequent to sending the request, receive assistance data from the remote device, wherein the assistance data comprises information indicative of at least one characteristic that is common among all APs of the plurality of APs, wherein:
    the information indicative of the at least one characteristic is associated with a first ID,
    the group ID is assigned to each AP of the plurality of APs, and
    the information indicative of the at least one characteristic comprises an identification of:
      an AP manufacturer,
      an AP model,
      a chip manufacturer, or
      a chip model, or
      a combination thereof;
  receive the group ID and a set of AP-specific information for at least one AP among the plurality of APs; and
  determine AP vicinity information corresponding to the at least one AP based on the group ID and the set of AP-specific information;
  wherein the information indicative of at least one characteristic comprises information corresponding to a reference grid, wherein the reference grid is used in determining the set of AP-specific information, and wherein the reference grid comprises one or more grid points associated with a signal characteristics for a first AP of the plurality of APs; and
  wherein:
    (i) the reference grid comprises a plurality of grid points, and wherein one or more grid points of the plurality of grid points is associated with a second AP of the plurality of APs;
    (ii) the reference grid defines a bounding box, the bounding box defining first and second reference axes that intersect, and wherein each of the one or more grid points has a coordinate based on the first and second reference axes; or
    a combination thereof.

15. The device of claim 14, wherein the reference grid defines the bounding box, and the one or more grid points are arranged, wherein the one or more grid points are arranged in rows and columns, wherein each row is parallel to a first reference axis and each column is parallel to a second reference axis.

16. The device of claim 14, wherein the reference grid defines the bounding box, and each coordinate comprises a local coordinate with respect to the reference grid, and wherein the reference grid is defined with respect to a fixed point, and wherein the fixed point has at least one of an absolute geographic coordinate or a specified civic location.

* * * * *